(12) United States Patent
Cheon et al.

(10) Patent No.: US 9,426,484 B2
(45) Date of Patent: *Aug. 23, 2016

(54) VIDEO ENCODING METHOD AND APPARATUS AND VIDEO DECODING METHOD AND APPARATUS, BASED ON TRANSFORMATION INDEX INFORMATION

(71) Applicant: SAMSUNG ELECTRONICS CO., LTD., Suwon-si (KR)

(72) Inventors: Min-su Cheon, Suwon-si (KR); Hae-kyung Jung, Seoul (KR); Jung-hye Min, Suwon-si (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,629

(22) Filed: May 22, 2015

(65) Prior Publication Data

US 2015/0256829 A1 Sep. 10, 2015

Related U.S. Application Data

(63) Continuation of application No. 12/856,272, filed on Aug. 13, 2010, now Pat. No. 9,148,665.

(30) Foreign Application Priority Data

Aug. 14, 2009 (KR) .......................... 10-2009-0075337

(51) Int. Cl.
*H04N 11/02* (2006.01)
*H04N 19/44* (2014.01)
(Continued)

(52) U.S. Cl.
CPC ......... *H04N 19/44* (2014.11); *H04N 19/00533* (2013.01); *H04N 19/119* (2014.11);
(Continued)

(58) Field of Classification Search
USPC ........................................ 375/240.01–240.29
See application file for complete search history.

(56) References Cited

U.S. PATENT DOCUMENTS

| | | | | |
|---|---|---|---|---|
| 4,947,447 A | * | 8/1990 | Miyaoka | G06T 9/40 375/E7.201 |
| 5,724,451 A | * | 3/1998 | Shin | G06T 9/40 375/E7.201 |

(Continued)

FOREIGN PATENT DOCUMENTS

| | | |
|---|---|---|
| CA | 2 738 037 A1 | 4/2010 |
| CA | 2889737 A1 | 2/2011 |

(Continued)

OTHER PUBLICATIONS

Communication dated Dec. 23, 2013 issued by the Canadian Intellectual Property Office in counterpart Canadian Patent Application No. 2,768,691.

(Continued)

*Primary Examiner* — Leron Beck
(74) *Attorney, Agent, or Firm* — Sughrue Mion, PLLC

(57) ABSTRACT

A method and apparatus for decoding video and a method and apparatus for encoding video are provided. The method for decoding video includes: receiving and parsing a bitstream of encoded video; extracting, from the bitstream, encoded image data of a current picture assigned to a maximum coding unit of the current picture, information regarding a coded depth of the maximum coding unit, information regarding an encoding mode, and coding unit pattern information indicating whether texture information of the maximum coding units has been encoded; and decoding the encoded image data for the maximum coding unit, based on the information regarding the coded depth of the maximum coding unit, the information regarding the encoding mode, and the coding unit pattern information.

4 Claims, 22 Drawing Sheets

(51) Int. Cl.

| | | |
|---|---|---|
| *H04N 19/70* | (2014.01) | |
| *H04N 19/61* | (2014.01) | |
| *H04N 19/176* | (2014.01) | |
| *H04N 19/119* | (2014.01) | |
| *H04N 19/96* | (2014.01) | |
| *H04N 19/147* | (2014.01) | |
| *H04N 19/122* | (2014.01) | |
| *H04N 19/136* | (2014.01) | |
| *H04N 19/184* | (2014.01) | |
| *H04N 19/60* | (2014.01) | |

(52) U.S. Cl.
CPC ........... *H04N19/122* (2014.11); *H04N 19/136* (2014.11); *H04N 19/147* (2014.11); *H04N 19/176* (2014.11); *H04N 19/184* (2014.11); *H04N 19/60* (2014.11); *H04N 19/61* (2014.11); *H04N 19/70* (2014.11); *H04N 19/96* (2014.11)

(56) References Cited

U.S. PATENT DOCUMENTS

| | | | | |
|---|---|---|---|---|
| 6,005,981 | A * | 12/1999 | Ng | G06T 9/40 375/E7.148 |
| 6,778,709 | B1 * | 8/2004 | Taubman | H04N 19/70 348/395.1 |
| 6,996,278 | B2 * | 2/2006 | Ohyama | H04N 1/41 382/232 |
| 7,496,143 | B2 * | 2/2009 | Schwarz | H03M 7/4006 375/240.18 |
| 8,023,564 | B2 * | 9/2011 | Thangaraj | H04N 19/61 375/240.25 |
| 8,086,052 | B2 * | 12/2011 | Toth | H04N 19/52 382/232 |
| 8,634,456 | B2 | 1/2014 | Chen et al. | |
| 9,148,665 | B2 | 9/2015 | Cheon et al. | |
| 9,300,957 | B2 | 3/2016 | Cheon et al. | |
| 2004/0066974 | A1 | 4/2004 | Karczewicz et al. | |
| 2005/0129113 | A1 | 6/2005 | Wang et al. | |
| 2005/0152453 | A1 | 7/2005 | Lee et al. | |
| 2005/0190977 | A1 * | 9/2005 | Jeon | H04N 19/176 382/239 |
| 2005/0213831 | A1 | 9/2005 | Van Der Schaar | |
| 2006/0039470 | A1 | 2/2006 | Kim et al. | |
| 2008/0049834 | A1 | 2/2008 | Holcomb et al. | |
| 2008/0131014 | A1 * | 6/2008 | Lee | H04N 19/154 382/251 |
| 2009/0144357 | A1 | 6/2009 | Cope et al. | |
| 2009/0196517 | A1 * | 8/2009 | Divorra Escoda | H04N 19/176 382/240 |
| 2010/0086029 | A1 * | 4/2010 | Chen | H04N 19/176 375/240.12 |
| 2010/0284466 | A1 * | 11/2010 | Pandit | H04N 19/597 375/240.16 |
| 2010/0295922 | A1 * | 11/2010 | Cheung | H04N 19/176 348/42 |
| 2011/0038418 | A1 * | 2/2011 | Pandit | G06T 9/001 375/240.16 |
| 2012/0106629 | A1 * | 5/2012 | Zheng | H04N 19/176 375/240.02 |

FOREIGN PATENT DOCUMENTS

| | | | |
|---|---|---|---|
| CN | 1640146 | A | 7/2005 |
| CN | 1830213 | A | 9/2006 |
| JP | 2012-504910 | A | 2/2012 |
| JP | 2013539313 | A | 10/2013 |
| JP | 5905616 | B2 | 4/2016 |
| KR | 1020050053297 | A | 6/2005 |
| KR | 10-2006-0021149 | A | 3/2006 |
| RU | 2 330 325 | C2 | 1/2006 |
| RU | 2011117578 | A | 11/2012 |
| WO | 2005-055612 | A1 | 6/2005 |
| WO | 2010/039733 | A3 | 4/2010 |
| WO | 2011087295 | A2 | 7/2011 |

OTHER PUBLICATIONS

Communication dated Mar. 31, 2014, issued by the State Intellectual Property Office of the People's Republic of China in counterpart Chinese Application No. 201080036194.0.

Communication dated May 13, 2014, issued by the Japanese Patent Office in counterpart Japanese Application No. 2012-524657.

Communication dated Nov. 27, 2013 issued by the Federal Service on Industrial Property in counterpart Russian Application No. 2012105018/07.

Communication, dated Jan. 16, 2013, issued by the Federal Service for Intellectual Property in counterpart Russian Patent Application No. 2012105018/07.

International Search Report (PCT/ISA/220 and PCT/ISA/210) issued in PCT/KR2010/005368; dated Feb. 22, 2011.

Kim, et al "Enlarging MB Size for High Fidelity Video Coding Beyond HD", ITU-Telecommunications Standardization Sector, Study Group 16, Question 6, Video Coding Experts Group (VCEG), 36th Meeting: San Diego USA, Oct. 8-10, 2006, pp. 1-6.

Naito, et al.; "Efficient Coding Scheme for Super High Definition Video Based on Extending H.264 High Profile", Video Communications and Image Processing, Jan. 17-19, 2006, vol. 6077, Pt. 2, pp. 1-8.

Siwei MA, et al., "High-definition video coding with super-macroblocks", (Invited Paper), Visual Communications and Image Processing, San Jose, Jan. 29, 2007, abstract, 2 pgs. total.

Ugur, et al.; "An Efficient H.264 Based Fine-Granular-Scalable Video Coding System", Signal Processing Systems Design and Implementation, Nov. 2-4, 2005, pp. 399-402.

Yamamoto, et al.; "Analysis on Transform and Partition Selection in Extended Block Sizes and Modification of Block Transforms", ITU-Telecommunications Standardization Sector, Study Group 16, Question 6, Video Coding Experts Group (VCEG), 37th Meeting: Yokohama, Japan, Apr. 15-18, 2009, pp. 1-5.

Zhang, et al.; "Region-Based Coding of Motion Fields for Low-Bitrate Video Compression", International Conference on Image Processing, Oct. 24-27, 2004, vol. 2. pp. 1117-1120.

Communication dated Jun. 16, 2015, issued by the European Patent Office in counterpart European Application No. 10808398.1.

Communication dated Aug. 4, 2015, issued by the European Patent Office in counterpart European Application No. 15166147.7.

Communication dated Aug. 4, 2015, issued by the European Patent Office in counterpart European Application No. 15166148.5.

Kim J et al.; "Enlarging MB size for high fidelity video coding beyond HD", 36. VCEG Meeting; Aug. 10, 2008-Oct. 10, 2008; San Diego, US; (Video Codingexperts Group of ITU-T SG.16),, No. VCEG-AJ21, Oct. 5, 2008, Total 6 pages, XP 030003643.

Qualcomm Inc; "Video Coding Using Extended Block Sizes"; ITU-T SG16 Meeting; Jan. 27, 2009-Feb. 6, 2009; Geneva,, No. T09-SG16-C-0123, Jan. 19, 2009, Total 4 pages, XP 030003764.

JVT; "Draft ITU-T Recommendation and Final Draft International Standard of Joint Video Specification (ITU-T Rec. H.264 | ISO/IEC 14496-10 AVC)", 7. JVT Meeting; 64. MPEG Meeting; Mar. 7, 2003-Mar. 14, 2003; Pattaya, TH; (Joint Video Team of ISO/IEC JTC1/SC29/WG11 and ITU-T SG.16),, No. JVT-G050rl, Mar. 14, 2003, p. 73 (total 269 pages), XP 030005712.

Communication dated Feb. 22, 2016, issued by the Korean Intellectual Property Office in counterpart Korean Application No. 10-2009-0075337.

Communication dated Feb. 22, 2016, issued by the Korean Intellectual Property Office in counterpart Korean Application No. 10-2015-0057534.

Communication dated Feb. 22, 2016, issued by the Korean Intellectual Property Office in counterpart Korean Application No. 10-2015-0057535.

Communication dated May 5, 2016, issued by the Canadian Intellectual Property Office in counterpart Canadian Application No. 2889729.

Communication dated Jun. 21, 2016, issued by the Japanese Patent Office in counterpart Japanese Application No. 2015-097948.

\* cited by examiner

FIG. 7
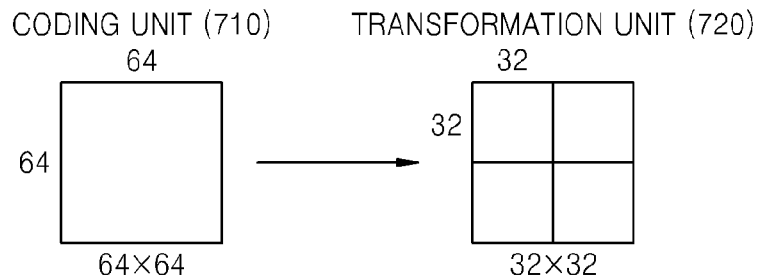
FIG. 8
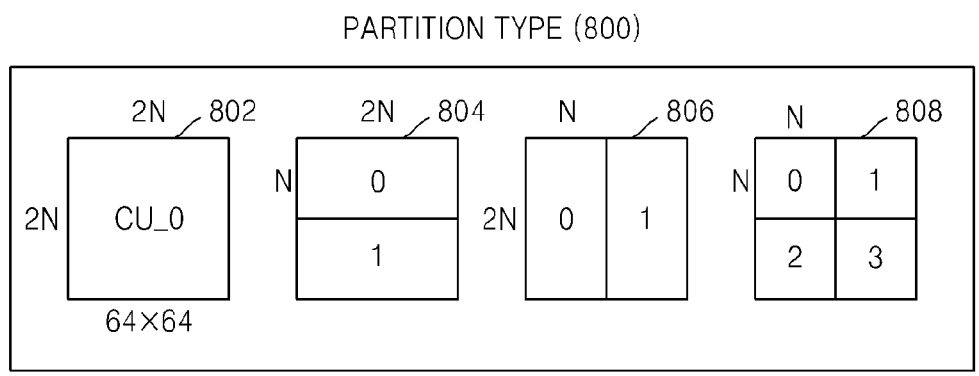
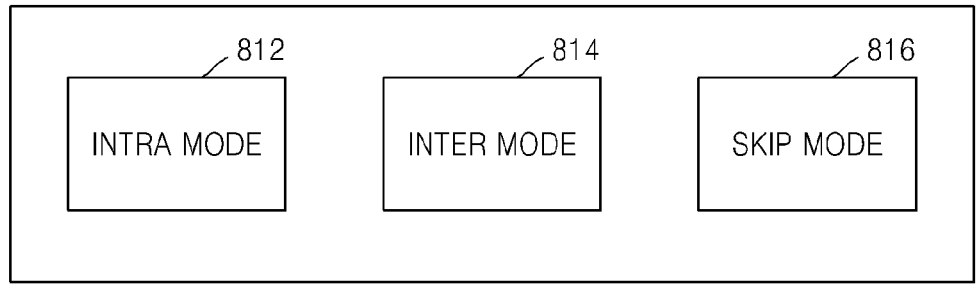
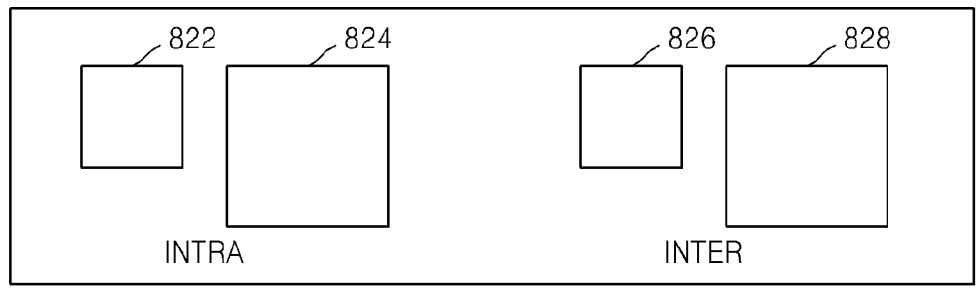

CODING UNITS (1010)

VIDEO ENCODING METHOD AND APPARATUS AND VIDEO DECODING METHOD AND APPARATUS, BASED ON TRANSFORMATION INDEX INFORMATION

CROSS-REFERENCE TO RELATED PATENT APPLICATION

This application is a continuation application of U.S. patent application Ser. No. 12/856,272, filed on Aug. 13, 2010 in the U.S. Patent and Trademark Office, which claims priority from Korean Patent Application No. 10-2009-0075337, filed on Aug. 14, 2009 in the Korean Intellectual Property Office, the contents of which are herein incorporated by reference in their entireties.

BACKGROUND

1. Field

Exemplary embodiments relate to encoding and decoding video.

2. Description of the Related Art

As hardware for reproducing and storing high resolution or high quality video content is being developed and supplied, a need for a video codec for effectively encoding or decoding the high resolution or high quality video content is increasing. In a related art video codec, video is encoded according to a limited encoding method based on a macroblock having a predetermined size. Also, in the related art video codec, coded block pattern information is encoded in units of macro blocks.

SUMMARY

Apparatuses and methods consistent with exemplary embodiments provide encoding and decoding video by using information indicating whether texture information of a coding unit has been encoded and in consideration of a hierarchical depth.

According to an aspect of an exemplary embodiment, there is provided a method of decoding video, the method including: receiving and parsing a bitstream of encoded video; extracting, from the bitstream, encoded image data of a current picture assigned to a maximum coding unit of the current picture, information regarding a coded depth of the maximum coding unit, information regarding an encoding mode, and coding unit pattern information indicating whether texture information of the maximum coding unit has been encoded; and decoding the encoded image data for the maximum coding unit, based on the information regarding the coded depth of the maximum coding unit, the information regarding the encoding mode, and the coding unit pattern information.

The coding unit may be characterized by a maximum size and a depth.

The depth may indicate a number of times a coding unit is hierarchically split, and as the depth deepens, deeper coding units according to depths may be split from the maximum coding unit to obtain minimum coding units.

The depth may be deepened from an upper depth to a lower depth.

As the depth deepens, the number of times the maximum coding unit is split may increase, and a total number of possible times the maximum coding unit is split may correspond to a maximum depth.

The maximum size and the maximum depth of the coding unit may be predetermined.

Coding unit pattern information regarding the maximum coding unit may include at least one of coding unit pattern information corresponding to coded depth, which is set for a coding unit corresponding to the coded depth, and hierarchical coding unit pattern information according to transformation depths, which indicates whether hierarchical coding unit pattern information regarding a lower depth has been encoded.

If the coding unit pattern information regarding the coding units according to the coded depths indicates that the texture information of the maximum coding units has been encoded, the decoding the encoded image data may include extracting transformation unit pattern information indicating whether texture information of at least one transformation unit included in the coding unit corresponding to the coded depth has been encoded.

If the transformation unit pattern information indicates that texture information of the transformation unit has been encoded, the decoding the encoded image data may include decoding the encoded texture information.

If the transformation unit pattern information indicates that texture information of the transformation unit has not been encoded, the decoding the encoded image data may include decoding the transformation unit by using information regarding transformation units adjacent to the transformation unit.

The coding unit pattern information corresponding to coded depth may be extracted according to color components of the image data.

If the coding unit corresponding to the coded depth includes at least four transformation units, the first group may be divided into four lower groups, and predetermined-bit coding unit pattern information corresponding to the coded depth may further be extracted for each of the four lower groups.

According to an aspect of another exemplary embodiment, there is provided a method of encoding video, the method including: splitting a current picture of the video into a maximum coding unit; determining a coded depth to output a final encoding result according to at least one split region, which is obtained by splitting a region of the maximum coding unit according to depths, by encoding the at least one split region, based on a depth that deepens in proportion to a number of times the region of the maximum coding unit is split; and outputting image data that is the final encoding result according to the at least one split region, and encoding and outputting information about the coded depth and a prediction mode and coding unit pattern information one of the maximum coding unit, wherein the coding unit pattern information indicates whether texture information of the maximum coding unit has been encoded.

The outputting of the image data may include setting and encoding the coding unit pattern information, based on whether all transformation coefficients of the texture information of the maximum coding unit are 0.

The outputting of the image data may include setting and encoding the coding unit pattern information corresponding to coded depth, according to the coded depth of the maximum coding unit, based on whether all transformation coefficients of the coding unit corresponding to the coded depths are 0.

If hierarchical coding unit pattern information and texture information regarding a coding unit corresponding to an upper depth of a current depth are not encoded, then the outputting of the image data may include setting and encoding hierarchical coding unit pattern information from an uppermost depth to the current depth.

The method may further include determining whether at least one of the coding unit pattern information corresponding to coded depth and the hierarchical coding unit pattern information for each of the at least one transformation depth, is to be used with respect to at least one of the current picture, a slice, and the maximum coding unit.

The outputting of the coding unit pattern information may include determining whether transformation unit pattern information is to be set for a transformation unit included in a coding unit corresponding to the coded depth, based on coding unit pattern information regarding the maximum coding unit, wherein the transformation unit pattern information indicates whether texture information of the transformation unit has been encoded.

According to an aspect of another exemplary embodiment, there is provided an apparatus for decoding video, the apparatus including: a receiver which receives and parses a bitstream of encoded video; an extractor which extracts, from the bitstream, encoded image data of a current picture assigned to a maximum coding unit, information regarding a coded depth of the maximum coding unit, information regarding an encoding mode, and coding unit pattern information indicating whether texture information of the maximum coding unit has been encoded; and an image data decoder which decodes the encoded image data in the maximum coding unit, based on the information regarding thee coded depth of the maximum coding unit, the information regarding the encoding mode, and the coding unit pattern information.

According to an aspect of another exemplary embodiment, there is provided an apparatus for encoding video, the apparatus including: a maximum coding unit splitter which splits a current picture into a maximum coding unit; a coding unit determiner which determines a coded depth to output a final encoding result according to at least one split region, which is obtained by splitting a region of each of the maximum coding unit according to depths, by encoding the at least one split region, based on a depth that deepens in proportion to a number of times the region of the maximum coding unit is split; and an output unit which outputs image data that is the final encoding result according to the at least one split region, and which encodes and outputs information about the coded depth and an encoding mode and coding unit pattern information of the maximum coding unit, wherein the coding unit pattern information indicates whether texture information of each of the at least one maximum coding unit has been encoded.

According to an aspect of another exemplary embodiment, there is provided a computer readable recording medium having recorded thereon a computer program for executing the above method of decoding video.

According to an aspect of another exemplary embodiment, there is provided a computer readable recording medium having recorded thereon a computer program for executing the above method of encoding video.

According to an aspect of another exemplary embodiment, there is provided a method of decoding video, the method including: extracting, from a bitstream of encoded video, encoded image data of a current picture assigned to a maximum coding unit of the current picture, information regarding a coded depth of the maximum coding unit, and coding unit pattern information indicating whether texture information of the maximum coding unit has been encoded; and decoding the encoded image data for the maximum coding unit, based on the extracted information regarding the coded depth of the maximum coding unit, and the coding unit pattern information.

BRIEF DESCRIPTION OF THE DRAWINGS

The above and/or other aspects will become more apparent by describing in detail exemplary embodiments thereof with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

Hereinafter, a method and apparatus for encoding video and a method and apparatus for decoding video according to one or more exemplary embodiments will be described with reference to the accompanying drawings. Particularly, video encoding and decoding performed based on coding units according to a tree structure including spatially independent, hierarchical data units according to one or more exemplary embodiments will be described with reference to FIGS. 1 to 15. Also, video encoding and decoding performed using coding unit pattern information regarding a coding unit according to such a tree structure according to one or more exemplary embodiments will be described in detail with reference to FIGS. 16 to 29. In the present specification, it is understood that expressions such as "at least one of," when preceding a list of elements, modify the entire list of elements and do not modify the individual elements of the list.

In the present specification, a coding unit is an encoding data unit in which image data is encoded at an encoder side and an encoded data unit in which the encoded image data is decoded at a decoder side, according to exemplary embodiments. Also, a coded depth indicates a depth where a coding unit is encoded.

In the present specification, an 'image' may denote a still image for a video or a moving image, that is, the video itself.

A method and apparatus for encoding video and a method and apparatus for decoding video, according to one or more exemplary embodiments, will be described with reference to FIGS. 1 to 15.

Figure 1:
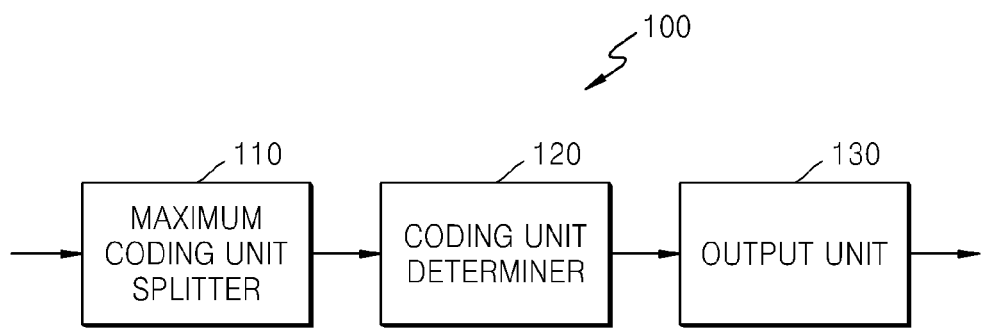
FIG. 1 is a block diagram of a video encoding apparatus according to an exemplary embodiment.

FIG. 1 is a block diagram of a video encoding apparatus 100 according to an exemplary embodiment. Referring to FIG. 1, the video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit. Accordingly, as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into one or more maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and maximum size of a coding unit, which limit the total number of times a height and width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. For example, the coding unit determiner 120 determines a coded depth by encoding the image data in the deeper coding units according to depths, according to the maximum coding unit of the current picture, and selecting a depth having the least encoding errors. Thus, the encoded image data of the coding unit corresponding to the determined coded depth is output by the coding unit determiner 120. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding errors may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit. Thus, the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of splitting times from a maximum coding unit to a minimum coding unit. A first maximum depth according to an exemplary embodiment may denote a total number of splitting times from the maximum coding unit to the minimum coding unit. A second maximum depth according to an embodiment of the present invention may denote a total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist. In this case, the first maximum depth may be set to 4, and the second maximum depth may be set to 5.

Prediction encoding and transformation may be performed according to the maximum coding unit. The prediction encoding and the transformation may also be performed based on the deeper coding units according to a depth equal to, or depths less than, the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation may be performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform the prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for the prediction encoding will be referred to as a prediction unit. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a transformation unit. A transformation depth indicating a number of splitting times to reach the transformation unit by splitting a height and a width of the coding unit may also be set in the transformation unit. For example, in a current coding unit of 2N×2N, a transformation depth may be 0 when a size of a transformation unit is also 2N×2N, may be 1 when each of the height and the width of the current coding unit is split into two equal parts, totally split into 4^1 transformation units, and the size of the transformation unit is thus N×N, and may be 2 when each of the height and the width of the current coding unit is split into four equal parts, totally split into 4^2 transformation units, and the size of the transformation unit is thus N/2×N/2. For example, the transformation unit may be set according to a hierarchical tree structure, in which a transformation unit of an upper transformation depth is split into four transformation units of a lower transformation depth according to hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth uses not only information about the coded depth, but also information about information related to prediction encoding and transformation. Accordingly, the coding unit determiner 120 not only determines a coded depth having a minimum encoding error, but also determines a partition type in a prediction unit, a prediction mode according to prediction units, and a size of a transformation unit for transformation.

Coding units according to a tree structure in a maximum coding unit and a method of determining a partition, according to one or more exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in a bitstream. The encoded image data may be obtained by encoding residual data of an image. The information about the encoding mode according to coded depth may include at least one of information about the coded depth, information about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth. Thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth. Thus, the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths. Thus, information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment may be a rectangular data unit obtained by splitting the minimum coding unit having the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include at least one of information about the prediction mode and information about a size of the partitions. The encoding information according to the prediction units may include at least one of information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or groups of pictures (GOPs), and information about a maximum depth may be inserted into a Sequence Parameter Set (SPS) or a header of a bitstream.

In the video encoding apparatus 100, the deeper coding unit may be a coding unit obtained by dividing at least one of a height and a width of a coding unit of an upper depth, which is one layer above, by two. In other words, when the size of the coding unit of the current depth is 2N×2N, the size of the coding unit of the lower depth may be N×N. Also, the coding unit of the current depth having the size of 2N×2N may include 4 of the coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any of various prediction modes and transformations, an optimum encoding mode may be determined considering characteristics of the coding unit of various image sizes.

Thus, if an image having a high resolution or a large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image while increasing a maximum size of a coding unit while considering a size of the image.

Figure 2:
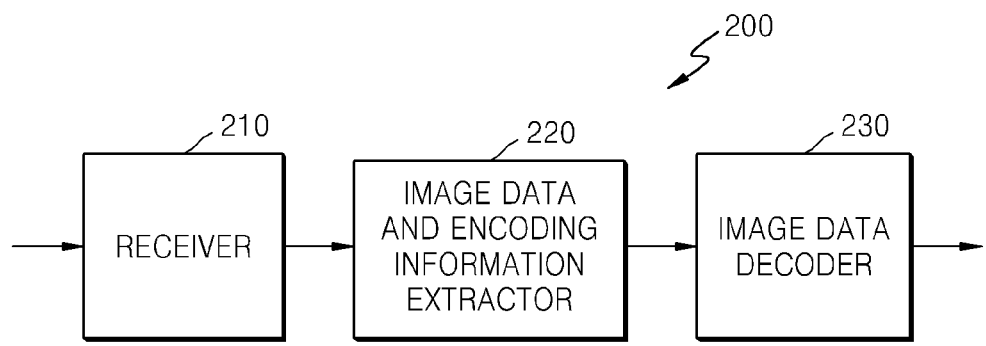
FIG. 2 is a block diagram of a video decoding apparatus according to an exemplary embodiment.

FIG. 2 is a block diagram of a video decoding apparatus 200, according to an exemplary embodiment. Referring to FIG. 2, the video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are the same or similar to those described above with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header corresponding to the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. Thus, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth. Furthermore, the information about the encoding mode may include at least one of information about a partition type of a corresponding coding unit corresponding to the coded depth, information about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include at least one of a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units including the encoding information including the same split information may be gathered by observing the encoding information set assigned for the predetermined data unit from among the coding unit, the prediction unit, and the minimum unit. Moreover, the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, a maximum size of the coding unit may be determined considering resolution and an amount of image data.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to one or more exemplary embodiments will now be described with reference to FIGS. 3 through 13.

Figure 3:
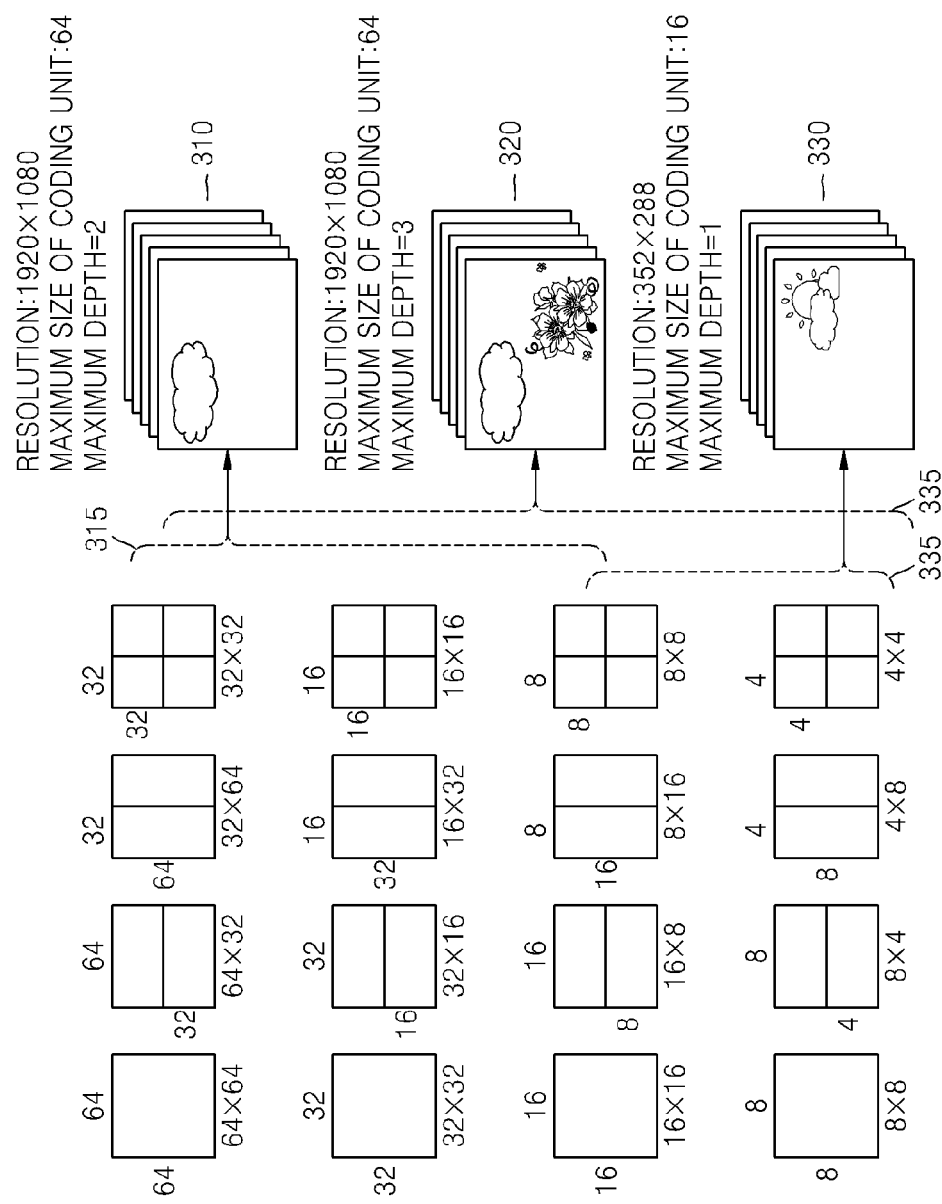
FIG. 3 is a diagram for describing a concept of coding units according to an exemplary embodiment.

FIG. 3 is a diagram for describing a concept of coding units according to an exemplary embodiment. A size of a coding unit may be expressed in width×height, and may be 64×64, 32×32, 16×16, and 8×8, though it is understood that another exemplary embodiment is not limited thereto. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 3, first video data 310 has a resolution is 1920×1080, a maximum size of a coding unit of 64, and a maximum depth of 2. Second video data 320 has a resolution of 1920×1080, a maximum size of a coding unit of 64, and a maximum depth of 3. Third video data 330 has a resolution of 352×288, a maximum size of a coding unit of 16, and a maximum depth of 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding units of the first and second video data 310 and 320 having a higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two layers by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one layer by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 layers by splitting the maximum coding unit three times. As a depth deepens (i.e., increases), detailed information may be precisely expressed.

Figure 4:
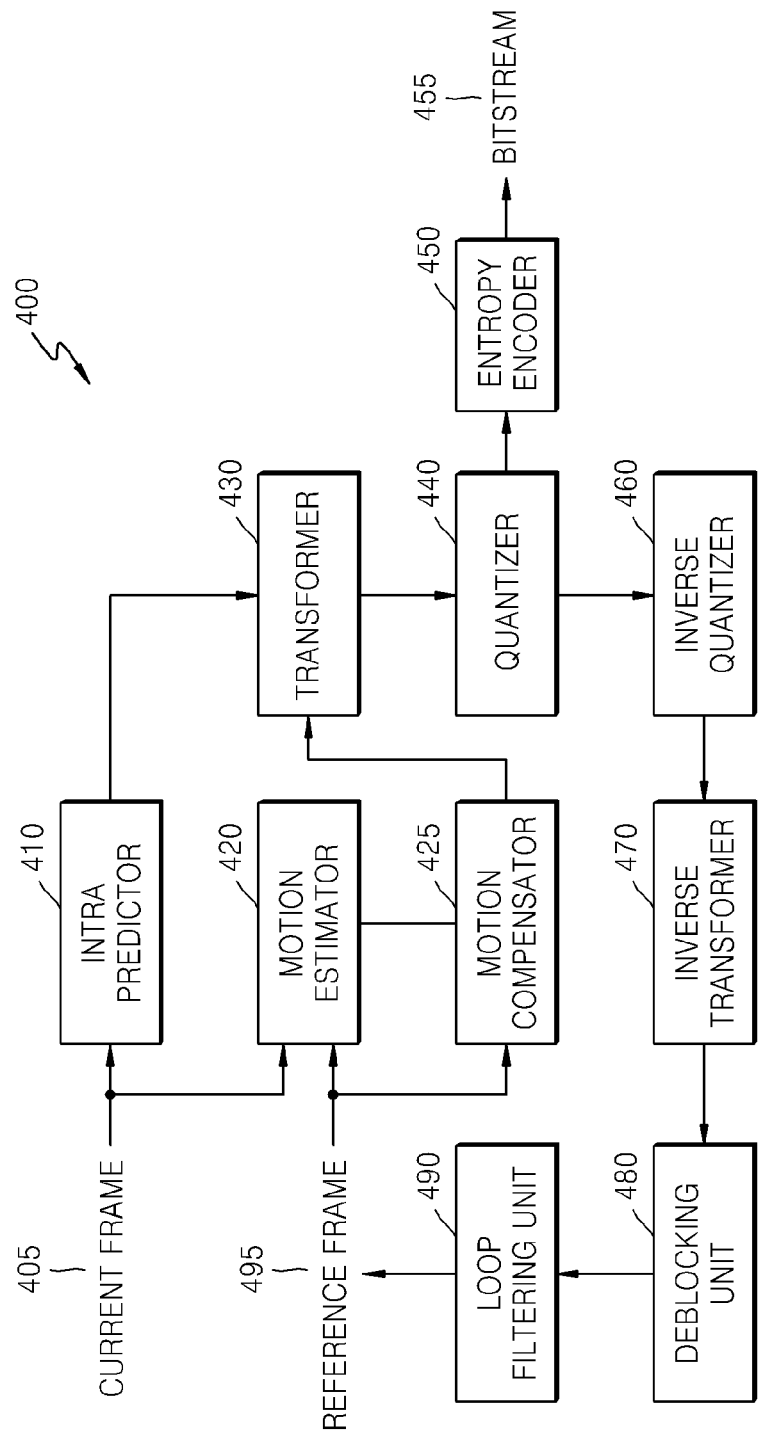
FIG. 4 is a block diagram of an image encoder based on coding units according to an exemplary embodiment.

FIG. 4 is a block diagram of an image encoder 400 based on coding units, according to an exemplary embodiment. Referring to FIG. 4, the image encoder 400 performs operations of the coding unit determiner 120 of the video encoding apparatus 100 to encode image data. For example, an intra predictor 410 performs intra prediction on coding units in an intra mode, from among a current frame 405, and a motion estimator 420 and a motion compensator 425 perform inter estimation and motion compensation, respectively, on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470. The restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines a size of the transformation unit in each coding unit from among the coding units having a tree structure.

Figure 5:
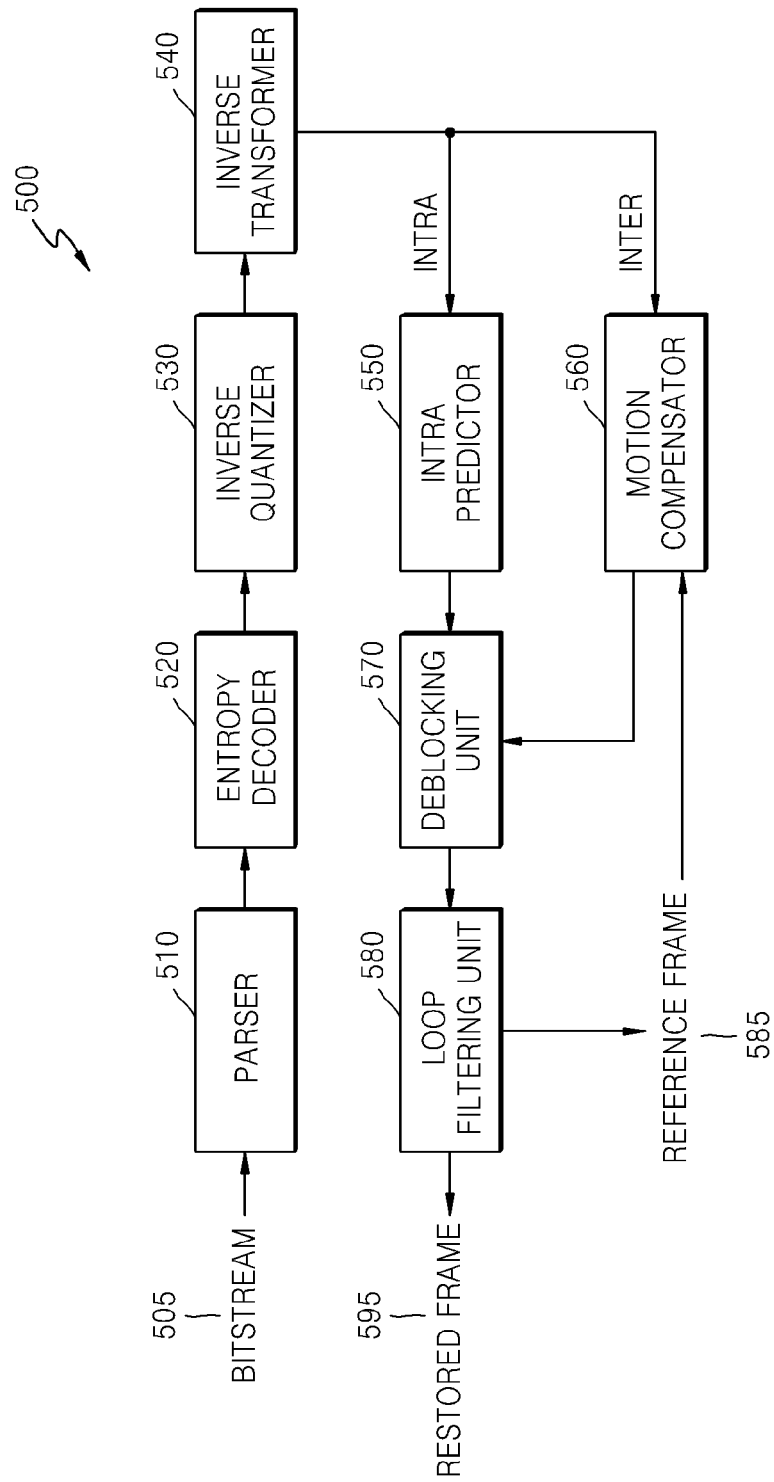
FIG. 5 is a block diagram of an image decoder based on coding units according to an exemplary embodiment.

FIG. 5 is a block diagram of an image decoder 500 based on coding units, according to an exemplary embodiment. Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 performs operations based on a size of a transformation unit for each coding unit.

Figure 6:
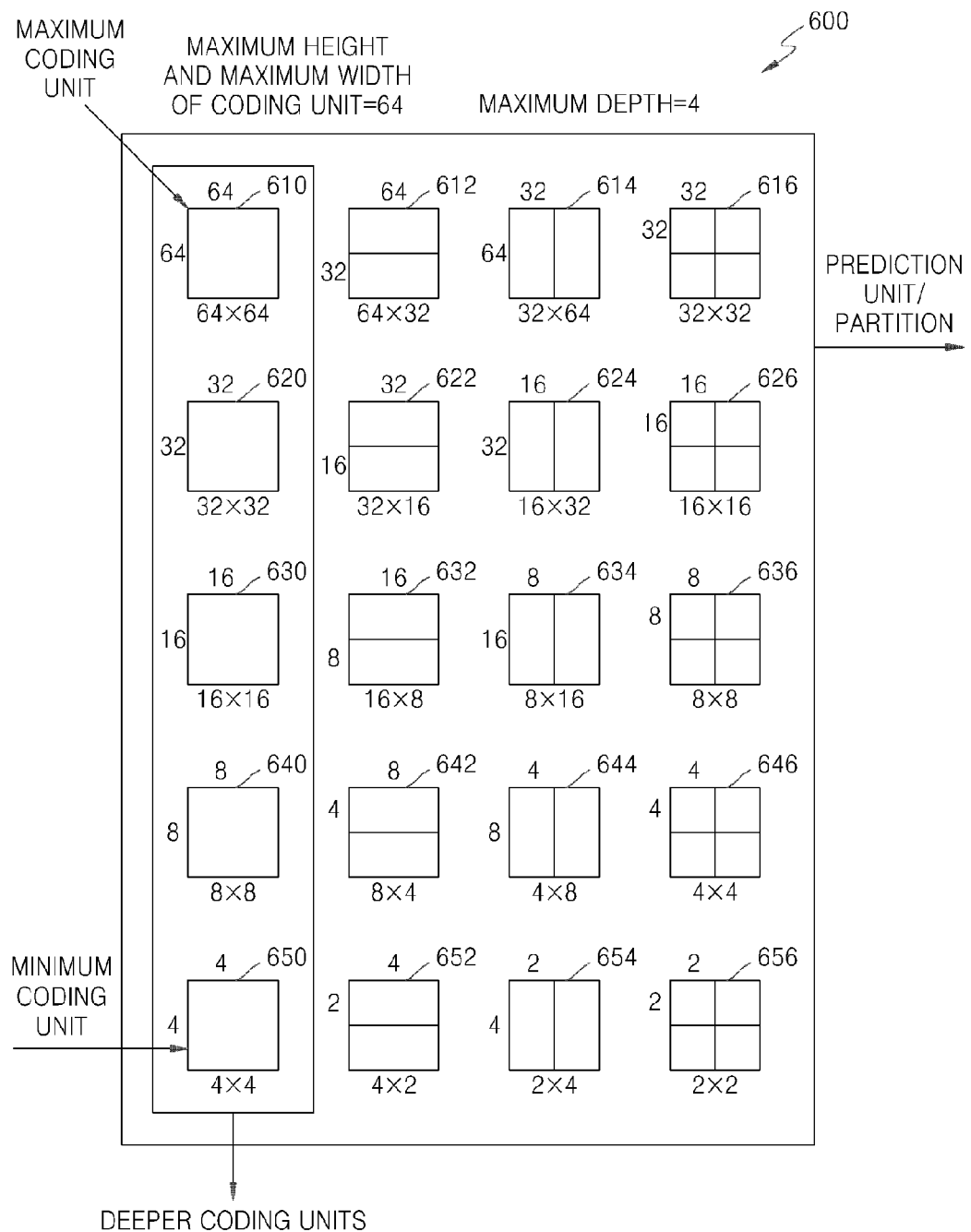
FIG. 6 is a diagram illustrating deeper coding units according to depths, and partitions according to an exemplary embodiment.

FIG. 6 is a diagram illustrating deeper coding units according to depths, and partitions, according to an exemplary embodiment. A video encoding apparatus 100 according to an exemplary embodiment and a video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to a predetermined maximum size of the coding unit.

Referring to FIG. 6, in a hierarchical structure 600 of coding units, according to an exemplary embodiment, the maximum height and the maximum width of the coding units are each 64, and the maximum depth is 4. Since a depth deepens (i.e., increases) along a vertical axis of the hierarchical structure 600, a height and a width of the deeper coding units are each split. Also, a prediction unit and partitions, which are bases for prediction encoding of each deeper coding unit, are shown along a horizontal axis of the hierarchical structure 600.

For example, a first coding unit 610 is a maximum coding unit in the hierarchical structure 600, wherein a depth thereof is 0 and a size, i.e., a height by width, thereof is 64×64. The depth deepens along the vertical axis such that the hierarchical structure 600 includes a second coding unit 620 having a size of 32×32 and a depth of 1, a third coding unit 630 having a size of 16×16 and a depth of 2, a fourth coding unit 640 having a size of 8×8 and a depth of 3, and a fifth coding unit 650 having a size of 4×4 and a depth of 4. The fifth coding unit 650 having the size of 4×4 and the depth of 4 is a minimum coding unit.

The prediction unit and the partitions of the coding units 610, 620, 630, 640, and 650 are arranged along the horizontal axis according to each depth. In other words, if the first coding unit 610 having the size of 64×64 and the depth of 0 is a prediction unit, the prediction unit may be split into partitions included in the first coding unit 610, i.e. a partition 610 having a size of 64×64, partitions 612 having a size of 64×32, partitions 614 having a size of 32×64, or partitions 616 having a size of 32×32.

Similarly, a prediction unit of the second coding unit 620 having the size of 32×32 and the depth of 1 may be split into partitions included in the second coding unit 620, i.e. a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e. a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e. a partition having a size of 8×8 included in the fourth coding unit 640, partitions 642 having a size of 8×4, partitions 644 having a size of 4×8, and partitions 646 having a size of 4×4.

The fifth coding unit 650 having the size of 4×4 and the depth of 4 is the minimum coding unit and a coding unit of the lowermost depth. A prediction unit of the fifth coding unit 650 is assigned to a partition having a size of 4×4.

In order to determine the at least one coded depth of the coding units of the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the first coding unit 610 may be selected as the coded depth and a partition type of the first coding unit 610.

FIG. 7 is a diagram for describing a relationship between a coding unit 710 and transformation units 720, according to an exemplary embodiment. A video encoding apparatus 100 according to an exemplary embodiment and a video decoding apparatus 200 according to an exemplary embodiment encodes and decodes, respectively, an image according to coding units having sizes smaller than or equal to a maximum coding unit for each maximum coding unit. Sizes of transformation units for transformation during encoding may be selected based on data units that are not larger than a corresponding coding unit.

Referring to FIG. 7, for example, in the video encoding apparatus 100, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding errors may be selected.

FIG. 8 is a diagram for describing encoding information of coding units corresponding to a coded depth, according to an exemplary embodiment. Referring to FIG. 8, the output unit 130 of a video encoding apparatus 100 according to an exemplary embodiment may encode and transmit first information 800 about a partition type, second information 810 about a prediction mode, and third information 820 about a size of a transformation unit for each coding unit corresponding to a coded depth, as information about an encoding mode.

The first information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the first information 800 about a partition type is set to indicate one of the partition 804 having a size of 2N×N, the partition 806 having a size of N×2N, and the partition 808 having a size of N×N The second information 810 indicates a prediction mode of each partition. For example, the second information 810 may indicate a mode of prediction encoding performed on a partition indicated by the first information 800, i.e., an intra mode 812, an inter mode 814, or a skip mode 816.

The third information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
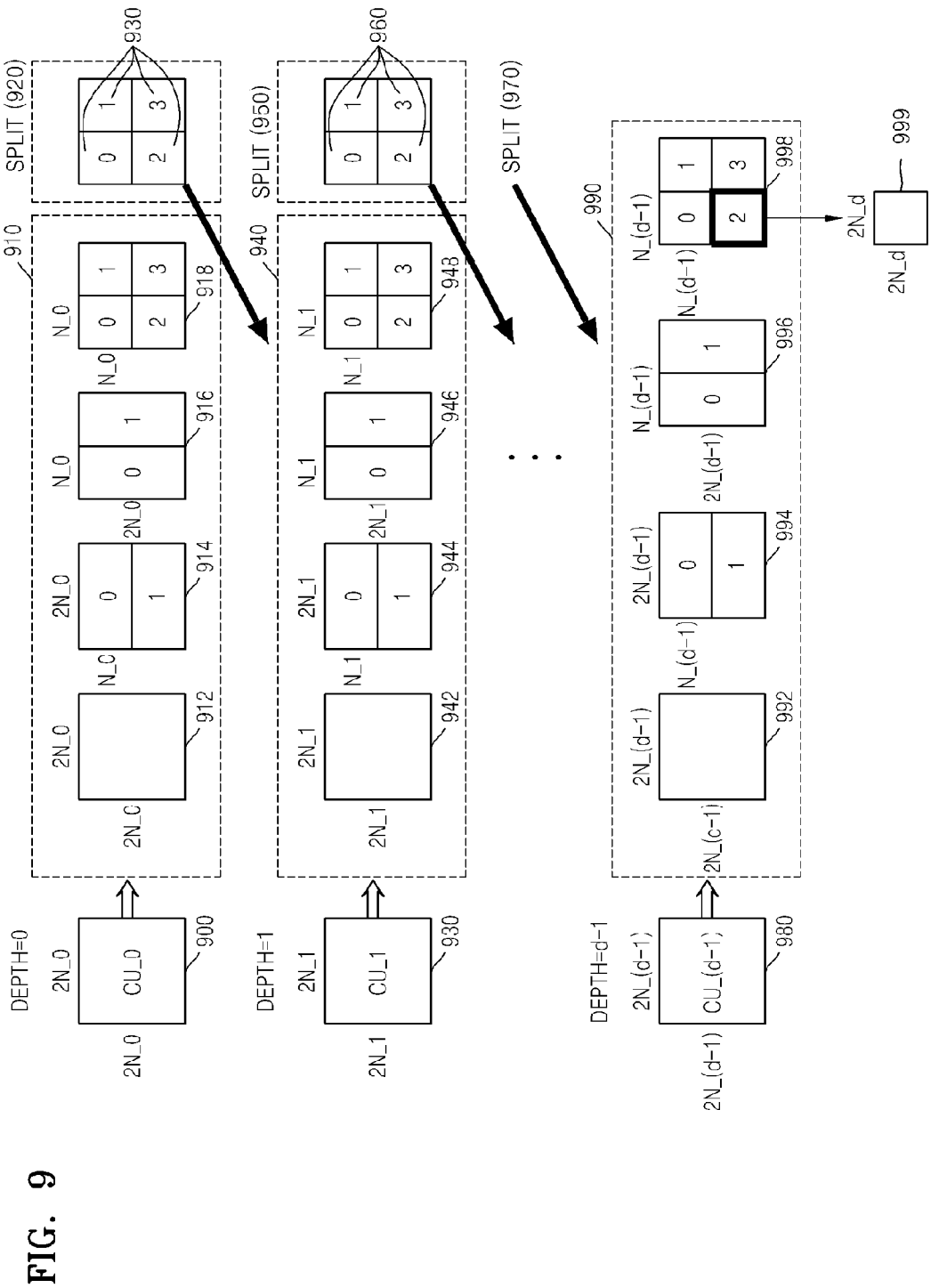
FIG. 9 is a diagram of deeper coding units according to depths, according to an exemplary embodiment.

An image data and encoding information extractor 220 of a video decoding apparatus 200 according to an exemplary embodiment may extract and use the information 800, 810, and 820 for decoding, according to each deeper coding unit FIG. 9 is a diagram of deeper coding units according to depths, according to an exemplary embodiment. Split information may be used to indicate a change of a depth. The spilt information indicates whether a coding unit of a current depth is split into coding units of a lower depth.

Referring to FIG. 9, a prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but it is understood that a partition type is not limited thereto in another exemplary embodiment. For example, according to another exemplary embodiment, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the minimum encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0× N_0 to search for a minimum encoding error.

A prediction unit 940 for prediction encoding the coding unit 930 having a depth of 1 and a size of 2N_1×2N_1 (=N_0× N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operations according to each depth may be performed up to when a depth becomes d−1, and split information may be encoded up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_ (d−1), a partition type 994 having a size of 2N_(d−1)×N_(d− 1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be considered a minimum unit for the current maximum coding unit. A minimum unit according to an exemplary embodiment may be a rectangular data unit obtained by splitting a minimum coding unit 980 by 4. By performing the encoding repeatedly, a video encoding apparatus 100 according to an exemplary embodiment may select a depth having the minimum encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding errors may be determined as a coded depth. At least one of the coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth are set to 1.

An image data and encoding information extractor 220 of a video decoding apparatus 200 according to an exemplary embodiment may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
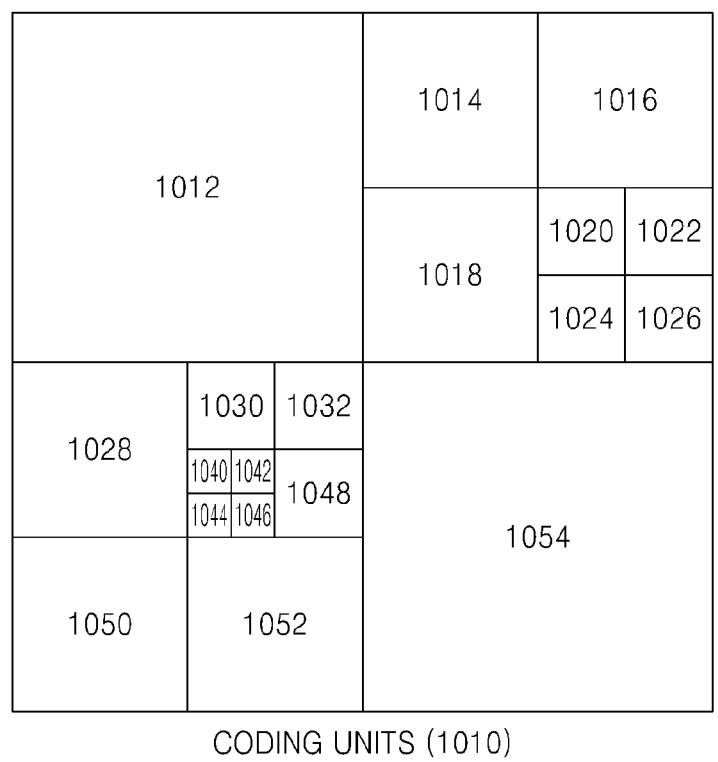
FIGS. 10 through 12 are diagrams for describing a relationship between coding units, prediction units, and transformation units, according to an exemplary embodiment.
Figure 11:
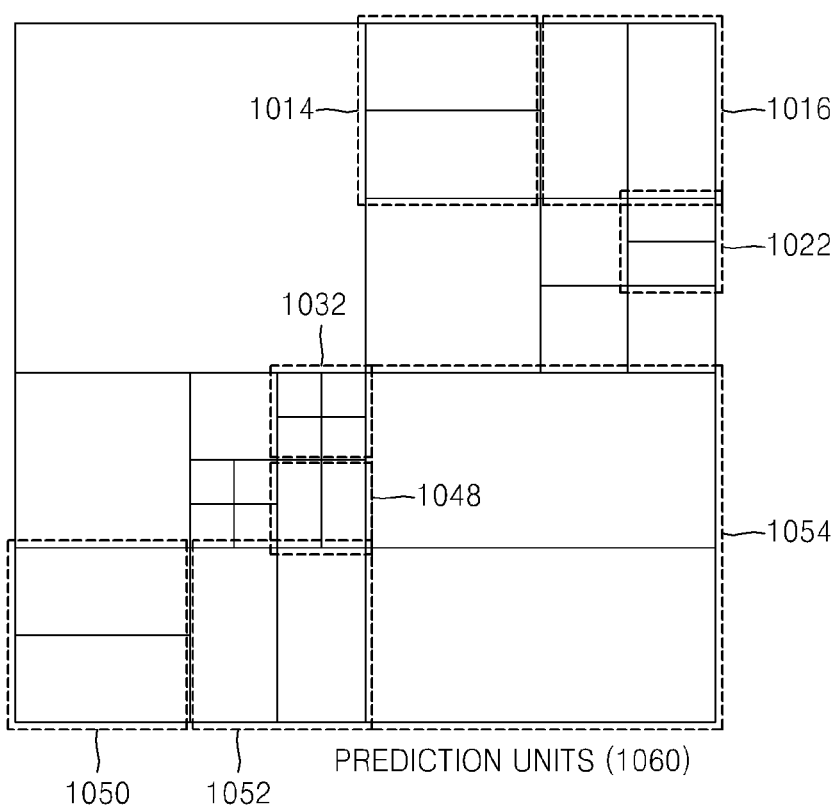
Figure 12:
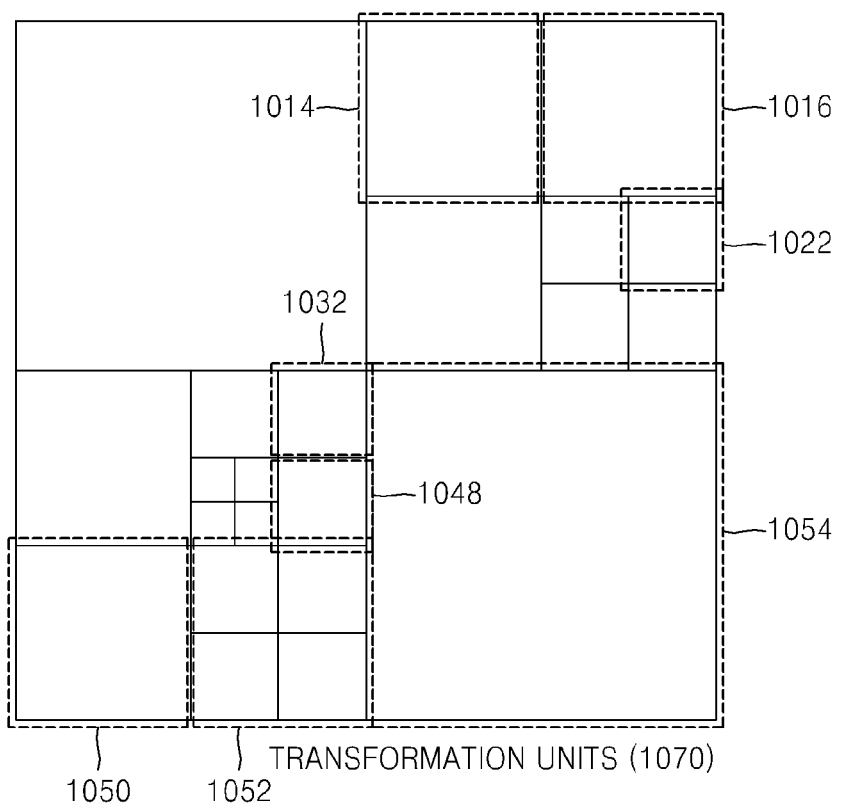

Referring to FIGS. 10 through 12, the coding units 1010 are coding units having a tree structure, corresponding to coded depths determined by a video encoding apparatus 100 according to an exemplary embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units of the coding units 1010. For example, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. For example, video encoding and decoding apparatuses 100 and 200 according to exemplary embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include at least one of split information about a coding unit, information about a partition type, information about a prediction mode, and information about a size of a transformation unit. Table 1 shows exemplary encoding information that may be set by the video encoding and decoding apparatuses 100 and 200.

TABLE 1

Split Information 0
(Encoding on Coding Unit having Size of 2N×2N and Current Depth of d)

| | | | Size of Transformation Unit | | |
|---|---|---|---|---|---|
| Prediction Mode | Partition Type | | Split Information 0 of Transformation Unit | Split Information 1 of Transformation Unit | Split Information 1 |
| | Symmetrical Partition Type | Asymmetrical Partition Type | | | |
| Intra Inter Skip (Only 2N×2N) | 2N×2N 2N×N N×2N N×N | 2N×nU 2N×nD nL×2N nR×2N | 2N×2N | N×N (Symmetrical Type) N/2×N/2 (Asymmetrical Type) | Repeatedly Encode Coding Units having Lower Depth of d + 1 |

FIGS. 10 through 12 are diagrams for describing a relationship between coding units 1010, prediction units 1060, and transformation units 1070, according to an exemplary embodiment.

An output unit 130 of the video encoding apparatus 100 may output the encoding information about the coding units having a tree structure, and an image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting at least one of a height and a width of a prediction unit, and asymmetrical partition types having sizes of 2N×nU, 2N×nD, nL×2N, and nR×2N, which are obtained by asymmetrically splitting at least one of the height and the width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. For example, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Therefore, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred to for predicting the current coding unit.

Figure 13:
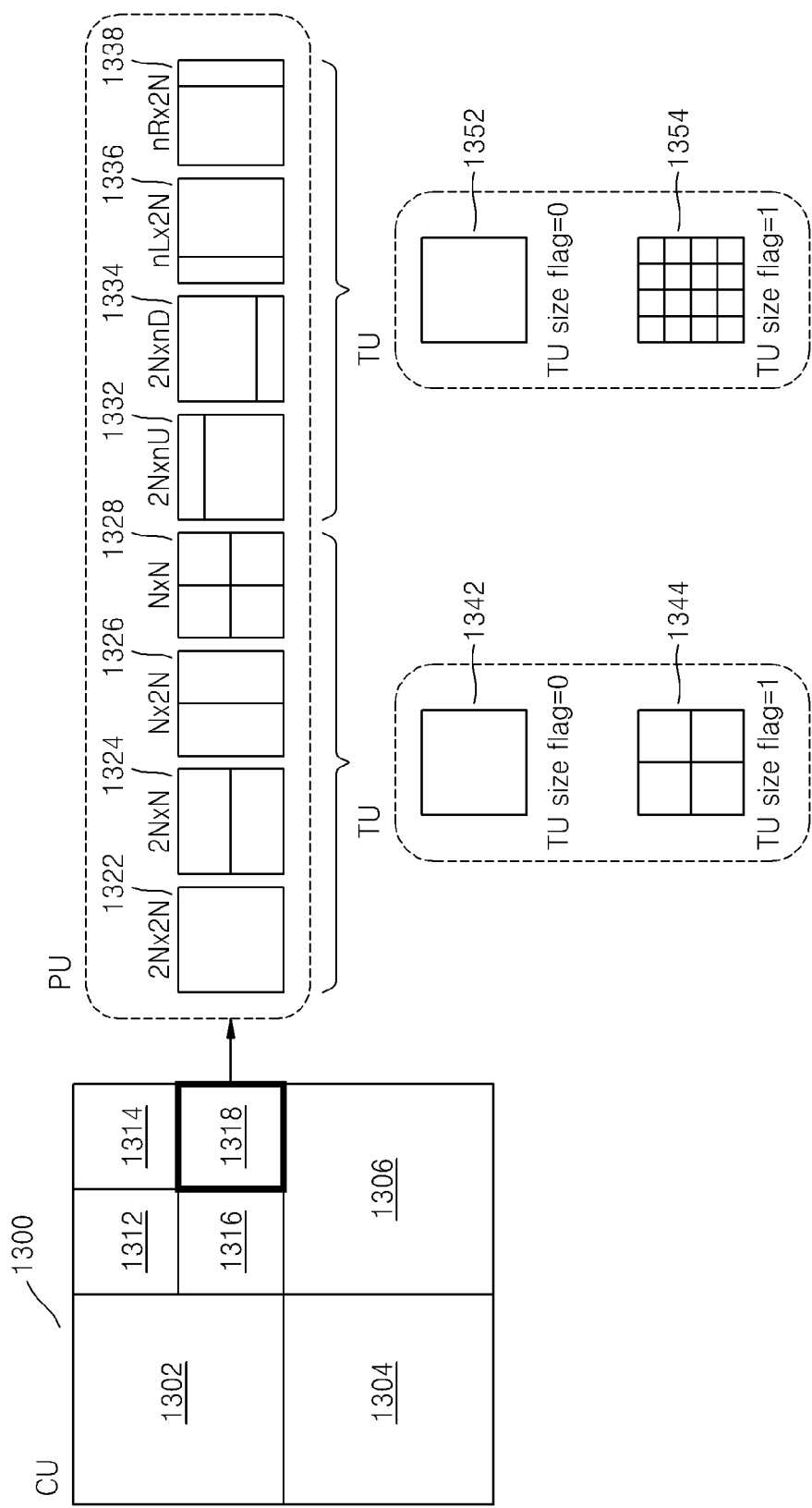
FIG. 13 is a diagram for describing a relationship between a coding unit, a prediction unit or a partition, and a transformation unit, according to encoding mode information according to an exemplary embodiment.

FIG. 13 is a diagram for describing a relationship between a coding unit, a prediction unit or a partition, and a transformation unit, according to encoding mode information of Table 1 according to an exemplary embodiment. Referring to FIG. 13, a maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, though it is understood that another exemplary embodiment is not limited to a 1-bit flag. For example, a transformation unit may be hierarchically split having a tree structure while the TU size flag increases from 0 in another exemplary embodiment.

In this case, the size of a transformation unit that has been actually used may be expressed by using a TU size flag of a transformation unit, according to an exemplary embodiment, together with a maximum size and minimum size of the transformation unit. According to an exemplary embodiment, a video encoding apparatus 100 may encode maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, a video decoding apparatus 200 may decode video by using the maximum transformation unit size information, the minimum transformation unit size information, and the maximum TU size flag.

For example, if the size of a current coding unit is 64×64 and a maximum transformation unit size is 32×32, the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, the TU size flag may be 0 or 1. Here, the TU size flag cannot be set to a value other than 0 or 1.

Thus, if it is defined that the maximum TU size flag is MaxTransformSizeIndex, a minimum transformation unit size is MinTransformSize, and a transformation unit size is RootTuSize when the TU size flag is 0, then a current minimum transformation unit size CurrMinTuSize that can be determined in a current coding unit, may be defined by Equation (1):

$$CurrMinTuSize=max(MinTransformSize, RootTuSize/(2^{MaxTransformSizeIndex})) \quad (1).$$

Compared to the current minimum transformation unit size CurrMinTuSize that can be determined in the current coding unit, a transformation unit size RootTuSize when the TU size flag is 0 may denote a maximum transformation unit size that can be selected in the system. In Equation (1), RootTuSize/(2^MaxTransformSizeIndex) denotes a transformation unit size when the transformation unit size RootTuSize, when the TU size flag is 0, is split a number of times corresponding to the maximum TU size flag, and MinTransformSize denotes a minimum transformation size. Thus, a smaller value from among RootTuSize/(2^MaxTransformSizeIndex) and MinTransformSize may be the current minimum transformation unit size CurrMinTuSize that can be determined in the current coding unit.

According to an exemplary embodiment, the maximum transformation unit size RootTuSize may vary according to the type of a prediction mode. For example, if a current prediction mode is an inter mode, then RootTuSize may be determined by using Equation (2) below. In Equation (2), MaxTransformSize denotes a maximum transformation unit size, and PUSize denotes a current prediction unit size:

$$RootTuSize=min(MaxTransformSize, PUSize) \quad (2).$$

That is, if the current prediction mode is the inter mode, the transformation unit size RootTuSize when the TU size flag is 0 may be a smaller value from among the maximum transformation unit size and the current prediction unit size:

If a prediction mode of a current partition unit is an intra mode, RootTuSize may be determined by using Equation (3) below. In Equation (3), PartitionSize denotes the size of the current partition unit:

$$RootTuSize=min(MaxTransformSize, PartitionSize) \quad (3).$$

That is, if the current prediction mode is the intra mode, the transformation unit size RootTuSize when the TU size flag is 0 may be a smaller value from among the maximum transformation unit size and the size of the current partition unit.

However, the current maximum transformation unit size RootTuSize that varies according to the type of a prediction mode in a partition unit is just an example, and it is understood that another exemplary embodiment is not limited thereto.

Figure 14:
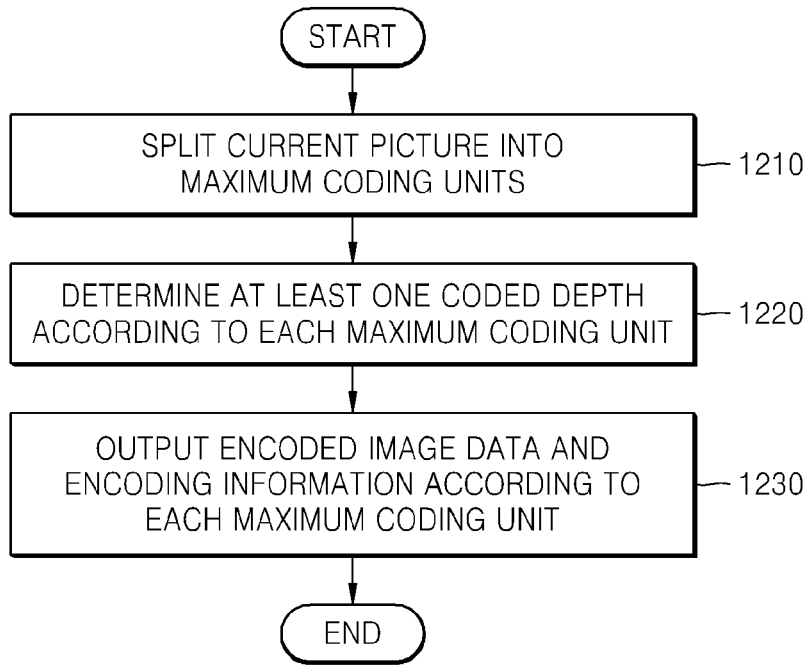
FIG. 14 is a flowchart illustrating a method of encoding a video, according to an exemplary embodiment.

FIG. 14 is a flowchart illustrating a method of encoding a video, according to an exemplary embodiment. Referring to FIG. 14, in operation 1210, a current picture is split into at least one maximum coding unit. A maximum depth indicating a total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having a minimum encoding error is determined for each deeper coding unit. In order to determine a coded depth having the minimum encoding error in each maximum coding unit, encoding errors may be measured and compared in all deeper coding units according to depths.

In operation 1230, encoded image data corresponding to the final encoding result according to the coded depth is output for each maximum coding unit, with encoding information about the coded depth and an encoding mode. The information about the encoding mode may include at least one of information about a coded depth or split information, information about a partition type of a prediction unit, a prediction mode, and a size of a transformation unit. The encoding information about the encoding mode may be transmitted to a decoder with the encoded image data.

Figure 15:
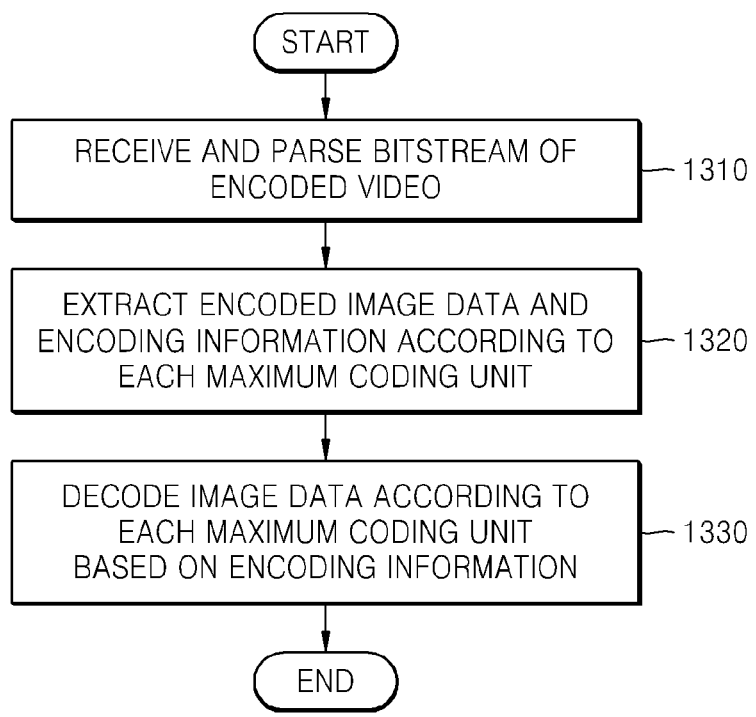
FIG. 15 is a flowchart illustrating a method of decoding a video, according to an exemplary embodiment.

FIG. 15 is a flowchart illustrating a method of decoding a video, according to an exemplary embodiment. Referring to FIG. 15, in operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having a minimum encoding error in each maximum coding unit. In encoding each maximum coding unit, the image data is encoded based on at least one data unit obtained by hierarchically splitting the maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the least encoding errors. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. For example, the decoded image data may be reproduced by a reproducing apparatus, stored in a storage medium, or transmitted through a network.

Now, video encoding and decoding performed using coding unit pattern information regarding a coding unit according to a tree structure, according to another exemplary embodiment of, will be described in detail with reference to FIGS. 16 to 29.

Figure 16:
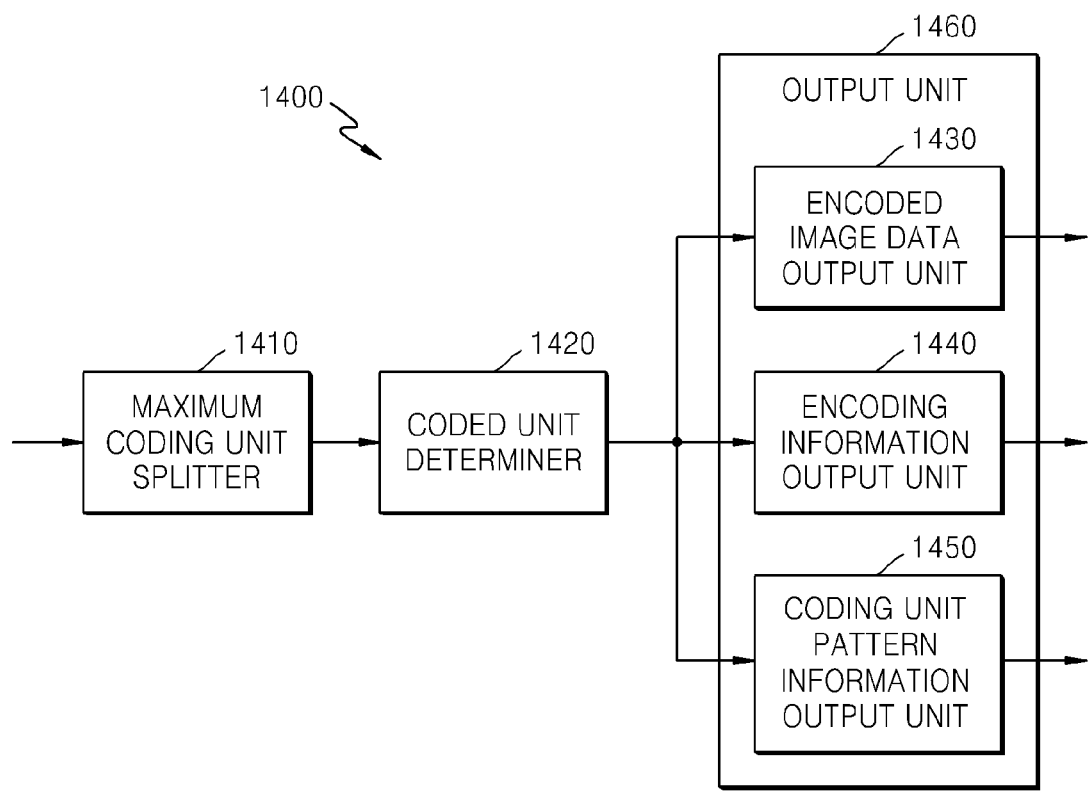
FIG. 16 is a block diagram of a video encoding apparatus using coding unit pattern information, according to an exemplary embodiment.

FIG. 16 is a block diagram of a video encoding apparatus 1400 using coding unit pattern information, according to an exemplary embodiment. Referring to FIG. 16, the video encoding apparatus 1400 includes a maximum coding unit splitter 1410, a coded unit determiner 1420, and an output unit 1460. The output unit 1460 includes an encoded image data output unit 1430, an encoding information output unit 1440, and a coding unit pattern information output unit 1450.

The maximum coding unit splitter 1410 and the coded unit determiner 1420 correspond to the maximum coding unit splitter 110 and the coded unit determiner 120 included in the video encoding apparatus 100 illustrated in FIG. 1, respectively. The operations of the encoded image data output unit 1430 and the encoding information output unit 1440 may be the same as or similar to at least some of the operations of the output unit 130 included in the video encoding apparatus 100 of FIG. 1. An exemplary embodiment in which the coding unit pattern information output unit 1450 encodes coding unit pattern information will now be described.

In the current exemplary embodiment, the maximum coding unit splitter 1410 splits a current picture of an image, based on a maximum coding unit for the current picture. The coded unit determiner 1420 determines at least one coded depth by encoding image data in coding units according to depths in each maximum coding unit and selecting a depth having the least encoding errors. Thus, the coded unit determiner 1420 may determine coding units having a tree structure included in each maximum coding unit.

The encoded image data output unit 1430 outputs a bitstream of the image data encoded according to the coded depth in each maximum coding unit. The encoding information output unit 1440 encodes and outputs information regarding encoding modes according to coded depths in each maximum coding unit.

The coding unit pattern information output unit 1450 encodes and outputs coding unit pattern information indicating whether texture information for each of the maximum coding units has been encoded. The texture information includes, for example, at least one of a quantization parameter, a transformation coefficient, and a transformation index for a data unit.

If the video encoding apparatus 1400 according to the current exemplary embodiment corresponds to the image encoder 400 of FIG. 4, then motion estimated/compensated data is generated from image data corresponding to a current coding unit by using the intra predictor 410, the motion estimator 420, and the motion compensator 425 of FIG. 4. The motion estimated/compensated data is transformed by the transformer 430 and is then quantized by the quantizer 440, thereby generating a transformation coefficient of the current coding unit.

The coding unit pattern information regarding the current coding unit may be set based on whether all transformation coefficients of the current coding unit are 0. The transformation coefficients of the current coding unit that are set to be encoded according to the coding unit pattern information may be input to the entropy encoder 450 to be output in a bitstream.

The coding unit pattern information is used so as to determine whether encoded texture is to be transmitted when the texture information is not to be encoded in coding units or when the texture information is to be encoded in coding units. For example, if all transformation coefficients in the coding units are 0, then the coding unit pattern information is set so as to indicate that the texture information is not to be encoded. However, if any one of the transformation coefficients in the coding unit is not 0, then the coding unit pattern information is set so as to indicate that the texture information has been encoded.

According to an exemplary embodiment, examples of the coding unit pattern information include coding unit pattern information corresponding to a coded depth, and hierarchical coding unit pattern information.

The coding unit pattern information corresponding to a coded depth is set for coding units corresponding to at least one coded depth in a maximum coding unit, and indicates whether texture information of a coding unit corresponding to a coded depth has been encoded. For example, the coding unit pattern information corresponding to a coded depth may indicate whether all transformation coefficients in coding units according to depths up to a coded depth, are 0.

Hierarchical coding unit pattern information is set for at least one transformation depth, respectively. A transformation depth of a maximum transformation unit is an uppermost transformation depth, and a transformation unit splits as a transformation depth becomes deeper. Also, a transformation unit of a current transformation depth may include four transformation units, the depths of which are lower by one layer than the current transformation depth.

Hierarchical coding unit pattern information corresponding to a current transformation depth indicates whether hierarchical coding unit pattern information regarding transformation units of the one-layer lower depths have been encoded. The coding unit pattern information output unit 1450 sets and encodes hierarchical coding unit pattern information for each of transformation depths ranging from an uppermost transformation depth to a lowermost transformation depth or to a predetermined depth.

For example, hierarchical coding unit pattern information may be set for each of transformation depths, and texture information of a transformation unit corresponding to the lowermost transformation depth may be encoded.

A transformation depth of a transformation unit may be linked to a depth and a coded depth of a corresponding coding unit. For example, a transformation depth may be set to be fixedly equal to or lower by one layer than a depth of a coding unit. Otherwise, a transformation depth may be set to be different from a depth of a coding unit.

According to an exemplary embodiment, in the video encoding apparatus 1400, whether only one of or both the coding unit pattern information corresponding to a coded depth and the hierarchical coding unit pattern information are to be encoded may be selectively set in at least one data unit selected from among a GOP, a picture, a slice, and a maximum coding unit.

For example, if both the coding unit pattern information corresponding to a coded depth and the hierarchical coding unit pattern information are used, then the coding unit pattern information output unit 1450 may set hierarchical coding unit pattern information for each of depths ranging from an uppermost depth to a current coded depth, and may set and encode coding unit pattern information corresponding to a coded depth for a coding unit corresponding to the current coded depth.

The coding unit corresponding to the coded depth may include at least one transformation unit. Transformation unit pattern information indicating whether texture information has been encoded, may be set for the at least one transformation unit, respectively. For example, the transformation unit pattern information indicates whether a current transformation unit includes a transformation coefficient other than 0.

When texture information of transformation units is to be encoded, the coding unit pattern information output unit 1450 may set transformation unit pattern information for each of the transformation units, and may set and encode coding unit pattern information corresponding to a coded depth of a coding unit that includes the transformation units.

If all the transformation coefficients in the encoding unit of the coded depth are not 0, then the encoded image data output unit 1430 may not output encoded texture information. According to an exemplary embodiment, if all transformation units belonging to a coding unit corresponding to the coded depth do not include transformation coefficients other than 0, then the coding unit pattern information output unit 1450 does not encode the transformation unit pattern information for the coding unit corresponding to the coded depth. Rather, the coding unit pattern information output unit 1450 may set and encode coding unit pattern information corresponding to a coded depth, which indicates the texture information of the coding unit corresponding to the coded depth is not to be encoded, for the coding unit corresponding to the coded depth.

The coding unit pattern information corresponding to the coded depth may be set according to color components of the image data. For example, the coding unit pattern information corresponding to the coded depth may be set for both of a luma component and a chroma component, or may be set for each of the luma component, the chroma component, a first chroma component, and a second chroma component (see FIGS. 18 to 26 for a more detailed description).

Coding unit pattern information to which one or more bits are assigned may be set in one of coding units according to depths and transformation units for each of maximum coding units.

Figure 17:
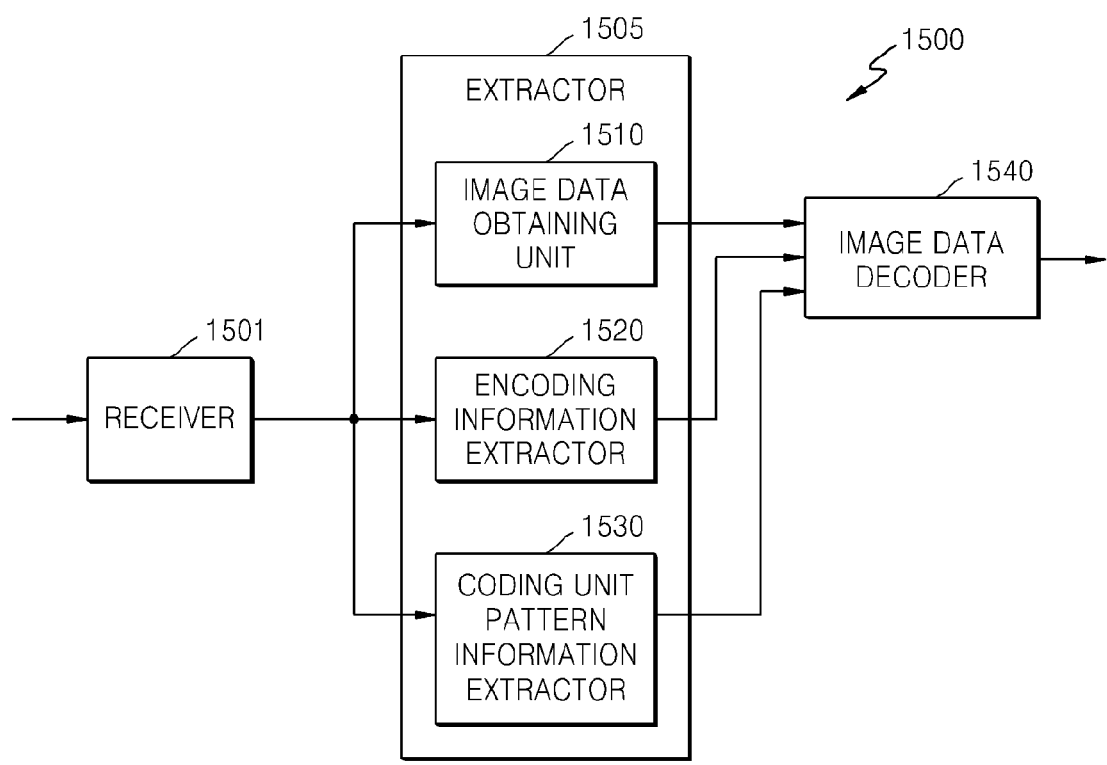
FIG. 17 is a block diagram of a video decoding apparatus using coding unit pattern information, according to an exemplary embodiment.

FIG. 17 is a block diagram of a video decoding apparatus 1500 using coding unit pattern information, according to an exemplary embodiment. Referring to FIG. 17, the video decoding apparatus 1500 includes a receiver 1501, an extractor 1505, and an image data decoder 1540. The extractor 1505 includes an image data obtaining unit 1510, a encoding information extractor 1520, and a coding unit pattern information extractor 1530.

The receiver 1501 and the image data decoder 1540 correspond to the receiver 210 and the image data decoder 230 included in the video decoding apparatus 200 of FIG. 2, respectively. The operations of the image data obtaining unit 1510, the encoding information extractor 1520, and the image data decoder 1540 are the same as or similar to at least some of the operations of the image data and encoding information extractor 220 of the video decoding apparatus 200 of FIG. 2. A method of performing decoding by using coding unit pattern information extracted by the coding unit pattern information extractor 1530 according to an exemplary embodiment will now be described with reference to FIG. 17.

The receiver 1501 receives and parses a bitstream of encoded video. The extractor 1505 extracts various types of encoding information from the result of parsing the bitstream. The image data obtaining unit 1510 may obtain image data that has been encoded in units of maximum coding units, from the result of parsing the bitstream. The encoding information extractor 1520 parses the bitstream and then extracts information regarding a coded depth and a encoding mode for each of the maximum coding units, from a header of a current picture.

The coding unit pattern information extractor 1530 extracts coding unit pattern information indicating whether texture information of a maximum coding unit has been encoded, for each of the maximum coding units. The coding unit pattern information extractor 1530 may extract coding unit pattern information corresponding to a coded depth and hierarchical coding unit pattern information regarding a current maximum coding unit, as the coding unit pattern information.

Whether only one of or both the coding unit pattern information corresponding to a coded depth and the hierarchical coding unit pattern information are to be extracted may be set in units of a GOP, a picture, a slice, or a maximum coding unit.

For example, one unit of coding unit pattern information corresponding to a coded depth may be extracted with respect to one coding unit according to a coded depth, or one unit of hierarchical coding unit pattern information may be extracted with respect to each of depths ranging from an uppermost depth to the coded depth. One unit of the coding unit pattern information may be predetermined bits. For each of the maximum coding units, one or more bits of coding unit pattern information may be set in either coding units according to depths or a transformation unit. For example, if the coding unit pattern information is in the form of flags, then one unit of the coding unit pattern information may be one bit.

The image data decoder 1540 reconstructs the current picture by decoding the image data that has been encoded in units of maximum coding units, based on the information regarding coded depths and encoding modes of the maximum coding units and the coding unit pattern information.

According to an exemplary embodiment, the image data decoder 1540 may check at least one coded depth of the current maximum coding unit, and may detect hierarchical structures of coding units according to depths of a tree structure included in the current maximum coding unit, based on the information regarding coded depths and encoding modes of the maximum coding units.

Also, the image data decoder 1540 may decode the encoded image data by performing an inverse transformation on a transformation coefficient included in the texture information of the maximum coding unit extracted by the coding unit pattern information extractor 1530, based on the coding unit pattern information regarding the maximum coding unit.

If the image data decoder 1540 corresponds to the image decoder 500 of FIG. 5, then the transformation coefficient included in the texture information of coding units may be inversely transformed into time-domain data by using the inverse quantizer 530 and the inverse transformer 540.

That is, if the coding unit pattern information indicates that the texture information of the current coding unit has been encoded according to the coding unit pattern information, then the image data decoder 1540 may receive a transformation coefficient that has been entropy decoded from the entropy decoder 520 of the image decoder 500 of FIG. 5, and perform inverse transformation on the transformation coefficient to obtain spatial-domain data. Time-domain data may be reconstructed into a reconstructed frame by using the intra predictor 550, the motion compensator 560, the deblocking unit 570, and the loop filtering unit 580 of the image decoder 500 of FIG. 5.

The coding unit pattern information extractor 1530 may detect at least one of coding pattern information of a coded depth and hierarchical coding pattern information, as coding unit pattern information regarding coding units according to coded depths for the current maximum coding unit.

If the coding pattern information according to a coded depth is detected, then the image data decoder 1540 may determine a method of decoding the coding unit corresponding to the current coded depth, based on the detected coding pattern information according to a coded depth.

For example, if it is determined based on the detected coding pattern information according to a coded depth that texture information of the coding unit corresponding to the current coded depth has not been encoded, then the image data decoder 1540 may decode the coding unit corresponding to the current coded depth by referring to information regarding a data unit adjacent to the coding unit corresponding to the current coded depth.

Also, if it is determined based on the detected coding pattern information according to a coded depth that the texture information of the coding unit corresponding to the current coded depth has been encoded, then the image data decoder 1540 may decode the coding unit corresponding to the current coded depth by performing inverse transformation on a transformation coefficient included in the encoded texture information of the coding unit corresponding to the current coded depth.

Furthermore, if the hierarchical coding pattern information is detected, the image data decoder 1540 may determine whether hierarchical coding pattern information regarding a lower transformation depth of a current transformation depth is present, and determine a method of decoding a transformation unit corresponding to the current transformation depth based on the detected hierarchical coding unit pattern information.

For example, if it is determined based on the detected hierarchical coding unit pattern information corresponding to the current transformation unit corresponding to the transformation depth that hierarchical coding pattern information regarding the lower depth of the current transformation depth is present, then the image data decoder 1540 may check the hierarchical coding pattern information regarding the lower transformation depth. However, if it is determined based on the detected hierarchical coding unit pattern information corresponding to the current transformation unit that hierarchical coding pattern information regarding the lower depth of the current transformation depth is not present, then the image data decoder 1540 may decode the current transformation unit corresponding to the current transformation depth.

If both the coding unit pattern information corresponding to a coded depth and the hierarchical coding unit pattern information are detected, then the image data decoder 1540 may check whether hierarchical coding pattern information regarding a lower transformation depth of the current transformation depth has been encoded, based on the hierarchical coding unit pattern information regarding the current transformation depth.

If it is determined that hierarchical coding pattern information regarding the lower transformation depth is present, then the hierarchical coding pattern information regarding the lower transformation depth may be checked. If it is determined based on the hierarchical coding unit pattern information corresponding to the current transformation depth that hierarchical coding pattern information regarding the lower transformation depth is not present, then the image data decoder 1540 may decode the transformation unit corresponding to the current transformation depth, based on coding unit pattern information related to the transformation unit corresponding to the current transformation depth.

Also, if the current transformation depth is a lowermost depth or a preset final depth, then the transformation unit corresponding to the current transformation depth may be set to be decoded regardless of hierarchical coding pattern information according to transformation depths. If the transformation unit corresponding to the current transformation depth is decoded, then the texture information, e.g., a quantization parameter, a transformation coefficient, a transformation index, etc., may be decoded.

The coding unit corresponding to the coded depth may include at least one transformation unit, and may be decoded by performing inverse transformation based on transformation unit pattern information that is set in each of the at least one transformation unit. That is, whether texture information of a desired transformation unit has been encoded may be determined based on the transformation unit pattern information.

Thus, if it is determined based on the coding unit pattern information corresponding to the coded depth that the coding unit has encoded texture information, then the image data decoder 1540 checks transformation unit pattern information of each of transformation units of the coding unit.

If it is determined based on the transformation unit pattern information that the desired transformation unit has encoded texture information, then the image data decoder 1540 may perform an inverse transformation on a transformation coefficient of the desired transformation unit. If it is determined based on the transformation unit pattern information that the desired transformation unit does not have encoded texture information, then the image data decoder 1540 may decode encoded image data of the desired transformation unit by using information regarding a transformation unit adjacent to the desired transformation unit.

If it is determined based on the coding unit pattern information corresponding to the coded depth that the desired transformation unit does not have encoded texture information, then transformation unit pattern information regarding all transformation units of the desired coding unit has not been encoded. In this case, the image data decoder 1540 may not detect transformation unit pattern information for each of the transformation units of the desired coding unit.

In the video encoding apparatus 1400 and the video decoding apparatus 1500 according to exemplary embodiments, coding unit pattern information or transformation unit pattern information that has been encoded based on coding units according to tree structures and transformation units may be used. Thus, it is possible to determine whether transformation unit pattern information of each of the transformation units has been encoded, based on coding unit pattern information that is set for a coding unit having a plurality of transformation unit groups. Since the number of coding units is less than that transformation units, setting coding unit pattern information for each of the coding units reduces the amount of data than when setting transformation unit pattern information for each of all the transformation units, thereby improving bit transmission efficiency.

Coding unit pattern information corresponding to a coded depth that is set according to color components of image data according to exemplary embodiments will now be described with reference to FIGS. 18 to 26. It is assumed in the following exemplary embodiments that one unit of coding unit pattern information is 1 bit, but it is understood that another exemplary embodiment is not limited thereto.

Figure 18:
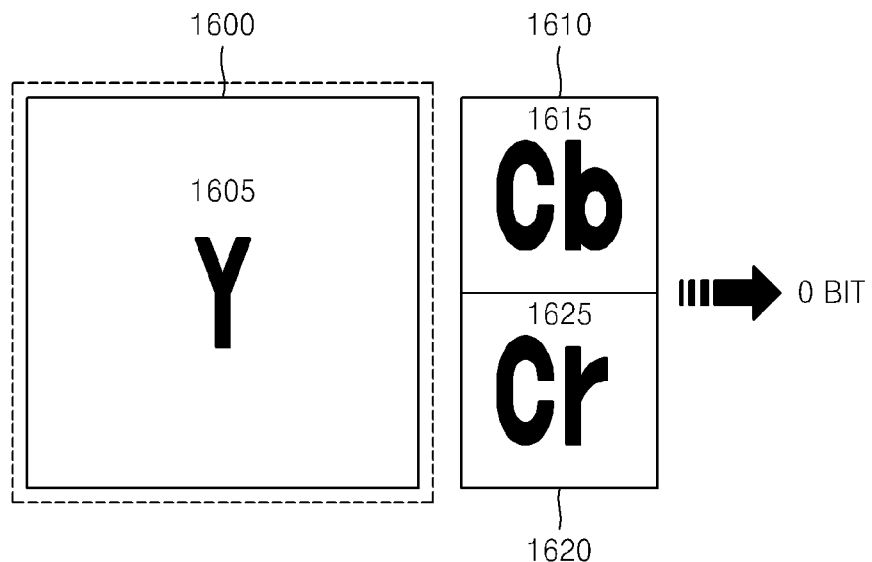
FIGS. 18 to 20 are block diagrams illustrating coding unit pattern information corresponding to a coded depth when a coding unit corresponding to a coded depth includes one transformation unit, according to exemplary embodiments.
Figure 19:
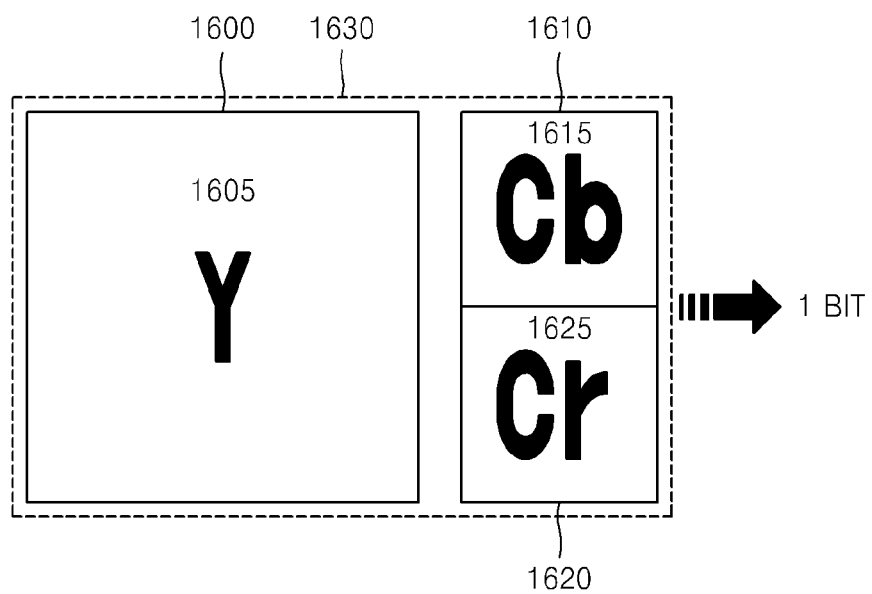
Figure 20:
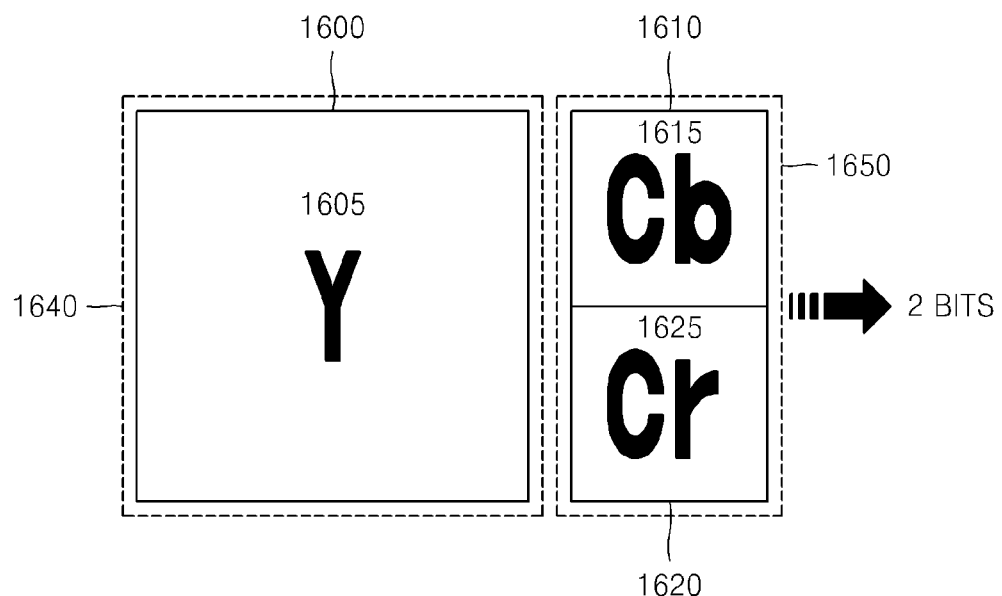

FIGS. 18 to 20 are block diagrams illustrating coding unit pattern information corresponding to a coded depth when a coding unit corresponding to a coded depth includes one transformation unit, according to one or more exemplary embodiments.

Referring to FIGS. 18 to 20, a first coding unit of color image data according to the YCbCr color standards includes a luma component coding unit 1600, a first chroma component coding unit 1610, and a second chroma component coding unit 1620 having a second chroma component.

If a transformation unit of the first coding unit is equal to the first coding unit in size, then the first coding unit includes only one transformation unit. Thus, the transformation unit of the first coding unit includes a luma component transformation unit 1605, a first chroma component transformation unit 1615, and a second chroma component transformation unit 1625. Transformation unit pattern information may be set for each of the luma component transformation unit 1605, the first chroma component transformation unit 1615, and the second chroma component transformation unit 1625.

Referring to FIG. 18, coding unit pattern information corresponding to a coded depth is not additionally encoded for the first coding unit. In this case, the coding unit pattern information output unit 1450 of FIG. 16 does not output coding unit pattern information corresponding to a coded depth for the first coding unit. The image data decoder 1540 of FIG. 17 may check only transformation unit pattern information for each of the luma component transformation unit 1605, the first chroma component transformation unit 1615, and the second chroma component transformation unit 1625 and perform an inverse transformation on transformation coefficients of the luma component transformation unit 1605, the first chroma component transformation unit 1615, and the second chroma component transformation unit 1625, based on the checking result, without checking coding unit pattern information corresponding to a coded depth for the first coding unit.

Referring to FIG. 19, 1-bit coding unit pattern information corresponding to a coded depth is set for a group 1630 to which a luma component transformation unit 1600, a first chroma component transformation unit 1610, and a second chroma component transformation unit 1620 of a first coding unit belong. In this case, the coding unit pattern information output unit 1450 of FIG. 16 outputs the 1-bit coding unit pattern information corresponding to a coded depth for the first coding unit.

Referring to FIG. 20, 1-bit coding unit pattern information corresponding to a coded depth is set for each of a group 1640 to which a luma component coding unit 1600 of a first coding unit belongs, and a group 1650 to which a first chroma component coding unit 1610 and a second chroma component coding unit 1620 of the first coding unit belong. In this case, the coding unit pattern information output unit 1450 of FIG. 16 outputs a 2-bit coding unit pattern information corresponding to a coded depth for the first coding unit.

According to an exemplary embodiment, the image data decoder 1540 of FIG. 17 may determine whether a desired coding unit includes encoded texture information by checking either the 1-bit coding unit pattern information corresponding to a coded depth of FIG. 19 or the 2-bit coding unit pattern information corresponding to a coded depth of FIG. 20, for a first coding unit. If the desired coding unit includes encoded texture information, then the image data decoder 1540 of FIG. 17 may check transformation unit pattern information of a corresponding transformation unit and perform inverse transformation on corresponding transformation coefficients, based on the checking result.

Figure 21:
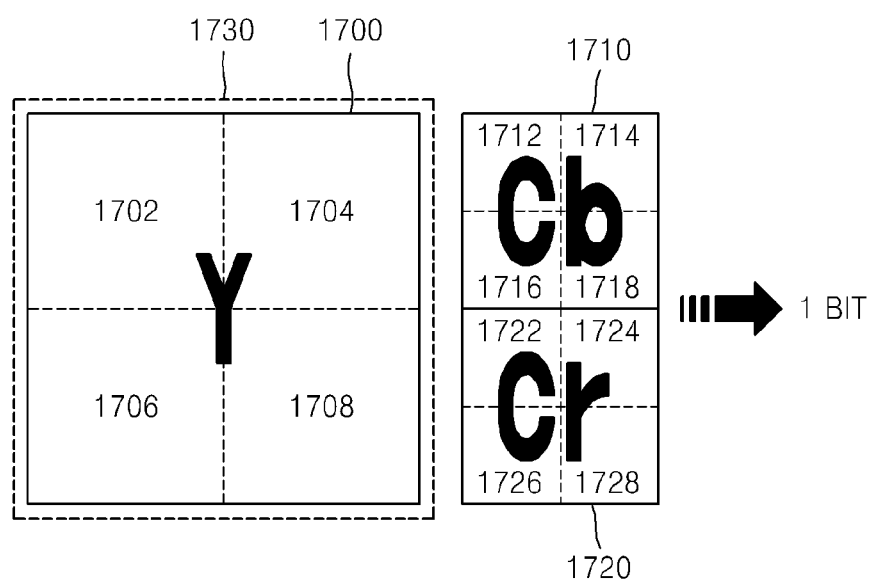
FIGS. 21 to 23 illustrate coding unit pattern information corresponding to a coded depth when a coding unit corresponding to the coded depth includes four transformation units, according to exemplary embodiments.
Figure 22:
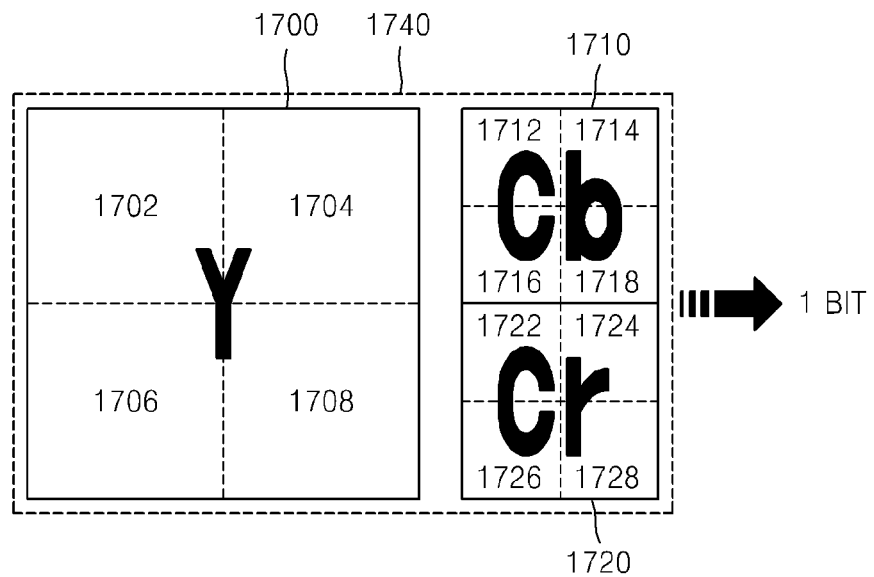
Figure 23:
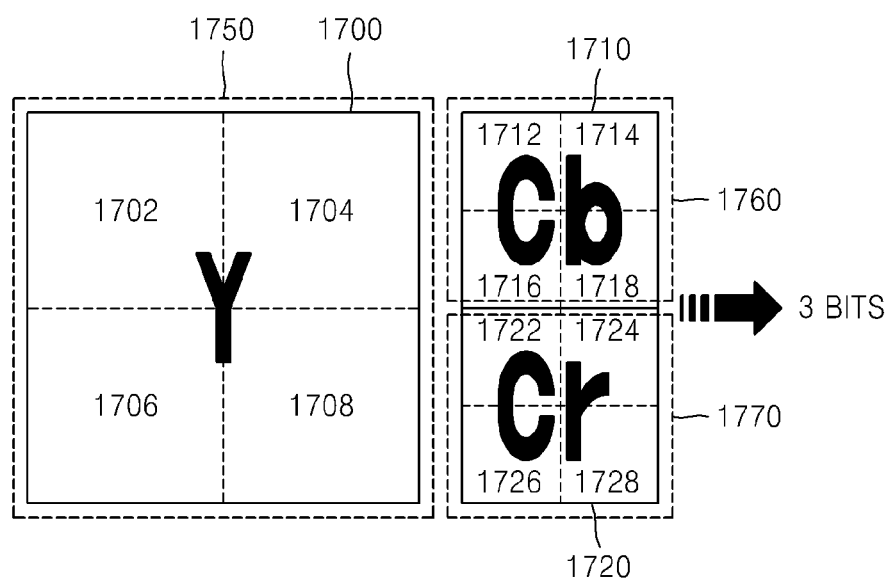

FIGS. 21 to 23 illustrate coding unit pattern information corresponding to a coded depth when a coding unit corresponding to the coded depth includes four transformation units, according to exemplary embodiments. Referring to FIGS. 21 to 23, a second coding unit of color image data according to the YCbCr color standards includes a luma component coding unit 1700, a first chroma component coding unit 1710, and a second chroma component coding unit 1720.

If the second coding unit includes four transformation units, then each of the coding units of the second coding unit, which are categorized according to a color component, also includes four transformation units. That is, the luma component coding unit 1700 includes four luma component transformation units 1702, 1704, 1706, and 1708, the first chroma component coding unit 1710 includes four first chroma component transformation units 1712, 1714, 1716, and 1718, and the second chroma component coding unit 1720 includes four second chroma component transformation units 1722, 1724, 1726, and 1728.

Referring to FIG. 21, 1-bit coding unit pattern information corresponding to a coded depth is set for a group 1730 to which only the luma component coding unit 1700 of the second coding unit belongs. However, coding unit pattern information corresponding to a coding depth is not set for the first chroma component coding unit 1710 and the second chroma component coding unit 1720.

In this case, the coding unit pattern information output unit 1450 of FIG. 16 outputs 1-bit coding unit pattern information corresponding to the coded depth regarding the luma component coding unit 1700. Accordingly, the image data decoder 1540 of FIG. 17 checks the 1-bit coding unit pattern information corresponding to the coded depth regarding the luma component coding unit 1700 and determines whether encoded texture information is present in the luma component coding unit 1700. If it is determined that the encoded texture information is present, then the image data decoder 1540 may check transformation unit pattern information of the luma component transformation units 1702, 1704, 1706, and 1708, and perform inverse transformation on transformation coefficients of the transformation units 1702, 1704, 1706, and 1708 based on the checking result.

Alternatively, the image data decoder 1540 may check only transformation unit pattern information of the first chroma component transformation units 1712, 1714, 1716, and 1718 and the second chroma component transformation units 1722, 1724, 1726, and 1728 and may perform an inverse transformation on transformation coefficients of the transformation units 1712, 1714, 1716, 1718, 1722, 1724, 1726, and 1728 based on the checking result, without checking coding unit pattern information corresponding to a coded depth of the first chroma component 1710 and the second chroma component 1720 of the second coding unit.

Referring to FIG. 22, 1-bit coding unit pattern information corresponding to a coded depth is set for a group 1740 to which a luma component coding unit 1700, a first chroma component coding unit 1710, and a second chroma component coding unit 1720 of a second coding unit belong. In this case, the coding unit pattern information output unit 1450 of FIG. 16 outputs the 1-bit coding unit pattern information corresponding to a coded depth for the second coding unit.

Referring to FIG. 23, 1-bit coding unit pattern information corresponding to a coded depth is set for each of a group 1750 to which a luma component coding unit 1700 of a second coding unit belongs, a group 1760 to which a first chroma component coding unit 1710 of the second coding unit belongs, and a group 1770 to which a second chroma component coding unit 1720 of the second coding unit belongs. In this case, the coding unit pattern information output unit 1450 of FIG. 16 outputs a 3-bit coding unit pattern information corresponding to a coded depth for the second coding unit.

The image data decoder 1540 of FIG. 17 may determine whether encoded texture information is present in a coding unit by checking either 1-bit coding unit pattern information corresponding to the coded depth (see FIG. 22) or 3-bit coding unit pattern information corresponding to the coded depth (see FIG. 23), for the second coding unit. If it is determined that the encoded texture information is present, then the image data decoder 1540 may check transformation unit pattern information of transformation units corresponding to the coding unit and perform an inverse transformation on transformation coefficients of the transformation units based on the checking result.

Figure 24:
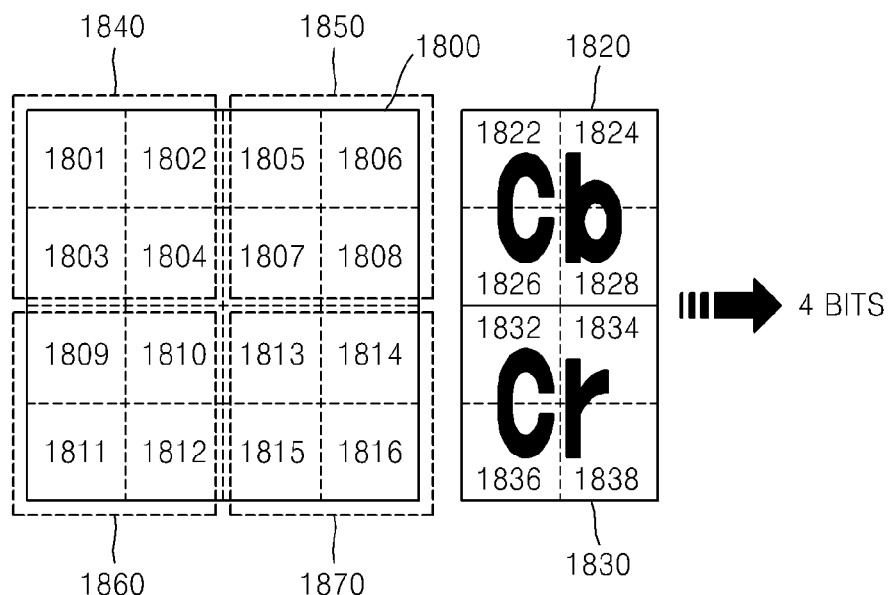
FIGS. 24 to 26 illustrate coding unit pattern information corresponding to a coded depth when a coding unit corresponding to the coded depth includes a plurality of transformation units, according to exemplary embodiments.
Figure 25:
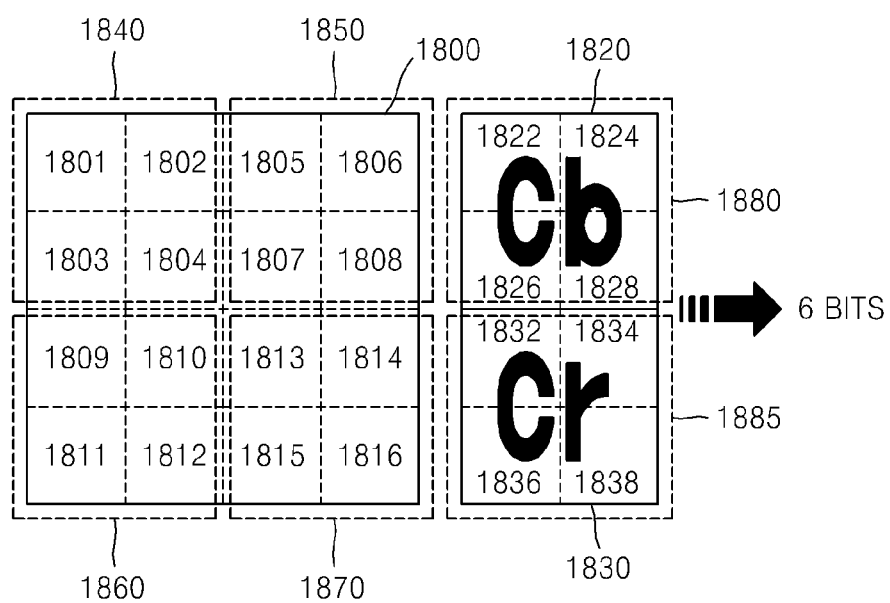
Figure 26:
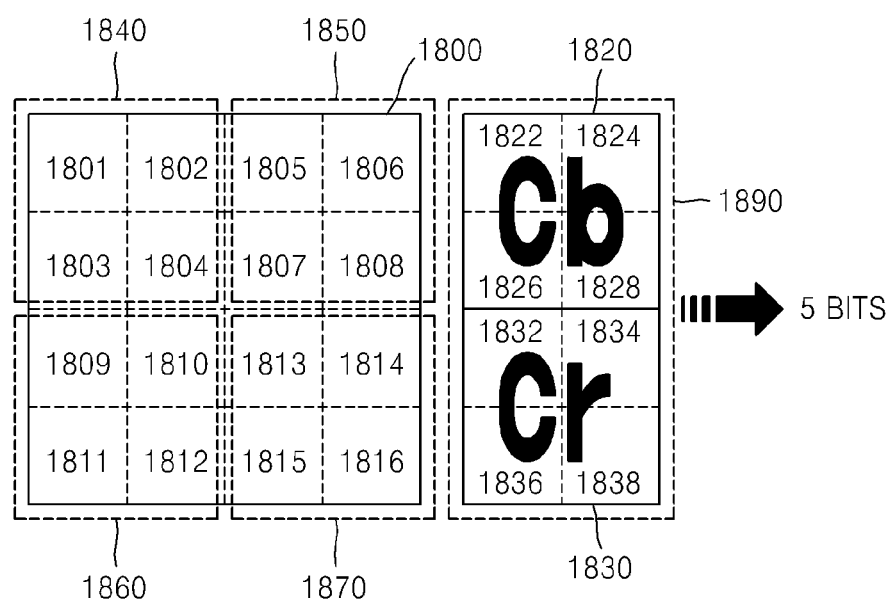

FIGS. 24 to 26 illustrate coding unit pattern information corresponding to a coded depth when a coding unit corresponding to the coded depth includes a plurality of transformation units, according to exemplary embodiments. Referring to FIGS. 24 to 26, third coding unit of color image data according to the YCbCr standards includes a luma component coding unit 1800, a first chroma component coding unit 1820, and a second chroma component coding unit 1830.

If the third coding unit includes at least four transformation units, then the luma component coding unit 1800 of the third coding unit also includes at least four transformation units. That is, the number of transformation units of the luma component coding unit 1800 is equal to the number of transformation units of the third coding unit. For example, if the third coding unit includes sixteen transformation units, then the luma component coding unit 1800 also includes sixteen luma component transformation units 1801, 1802, 1803, 1804, 1805, 1806, 1807, 1808, 1809, 1810, 1811, 1812, 1813, 1814, 1815, and 1816.

Each of the first chroma component coding unit 1820 and the second chroma component coding unit 1830 may include four transformation units. That is, the first chroma component coding unit 1810 may include four first chroma component transformation units 1822, 1824, 1826, and 1828, and the second chroma component coding units 1830 may include four second chroma component transformation units 1832, 1834, 1836, and 1838.

One unit of coding unit pattern information corresponding to a coded depth may be set as coding unit pattern information corresponding to a coded depth for a part of the luma component coding unit 1800, for a group to which a predetermined number of luma component transformation units belong. For example, coding unit pattern information corresponding to a coded depth may be set for each of groups to which four luma component transformation units of the luma component coding unit 1800 belong. That is, in the luma component coding unit 1800, 1-bit coding unit pattern information may be set for each of a group 1840 to which four transformation units 1801, 1802, 1803, and 1804 belong, a group 1850 to which four transformation units 1805, 1806, 1807, and 1808 belong, a group 1860 to which four transformation units 1809, 1810, 1811, and 1812 belong, and a group 1870 to which four transformation units 1813, 1814, 1815, and 1816 belong.

Referring to FIG. 24, coding unit pattern information corresponding to a coded depth is not set for the first chroma component coding unit 1820 and the second chroma component coding unit 1830.

In this case, the coding unit pattern information output unit 1450 of FIG. 16 outputs 4-bit coding pattern information corresponding to the coded depth for the groups 1840, 1850, 1860, and 1870 of the luma component coding unit 1800. The image data decoder 1540 of FIG. 17 checks the 4-bit coding pattern information corresponding to the coded depth, and determines whether encoded texture information is present for each of the groups 1840, 1850, 1860, and 1870.

Alternatively, the image data decoder 1540 may check transformation unit pattern information of the first chroma component transformation units 1822, 1824, 1826, and 1828 and the second chroma component transformation units 1832, 1834, 1836, and 1838 without checking pattern information corresponding to the coded depth for the first chroma component 1820 and the second chroma component coding unit 1830.

Referring to FIG. 25, in a third coding unit, 1-bit coding unit pattern information corresponding to a coded depth is set for each of a plurality of luma component coding unit groups 1840, 1850, 1860, and 1870, a group 1880 to which a first chroma component coding unit 1820 belongs, and a group 1885 to which a second chroma component coding unit 1830 belongs. In this case, the coding unit pattern information output unit 1450 of FIG. 16 outputs 6-bit coding unit pattern information corresponding to the coded depth, for the third coding unit.

Referring to FIG. 26, in a third coding unit, 1-bit coding unit pattern information corresponding to a coded depth is set for each of a plurality of luma component coding unit groups 1840, 1850, 1860, and 1870, and a group 1890 to which a first chroma component coding unit 1820 and a second chroma component coding unit 1830 belong. In this case, the coding unit pattern information output unit 1450 of FIG. 16 outputs 5-bit coding unit pattern information corresponding to the coded depth, for the third coding unit.

The image data decoder 1540 of FIG. 17 determines whether encoded texture information is present for the coding unit by checking either the 6-bit coding unit pattern information corresponding to the coded depth (see FIG. 25) or the 5-bit coding unit pattern information corresponding to the coded depth (see FIG. 26) for the third coding unit. If it is determined that the encoded texture information is present, the image data decoder 1540 may check transformation unit pattern information of a transformation unit included in the coding unit, and perform an inverse transformation on transformation coefficients of the transformation units based on the checking result.

As described above, according to one or more exemplary embodiments, coding unit pattern information may be set for each of color components, and a plurality of pieces of coding unit pattern information of the same coding unit, which are categorized according to a color component, may be combined and encoded.

In a video encoding apparatus 100 and a video decoding apparatus 200 according to exemplary embodiments, a plurality of pieces of coding unit pattern information that are categorized according to a color component may be encoded or decoded in an integrated manner, based on the relationship among coding unit pattern information regarding a luma component, first chroma component, and second chroma component of the same coding unit and the relationship among coding unit pattern information of the same color component regarding neighboring coding units.

For example, for variable-length coding (VLC) of a current coding unit, coding unit pattern information regarding a luma component, coding unit pattern information regarding a first chroma component, and coding unit pattern information regarding a second chroma component may be combined and encoded using one codeword.

Furthermore, by way of example, a VLC table may be set in such as manner that different unary codewords correspond to combinations of a plurality of pieces of coding unit pattern information, which are categorized according to a color component, respectively. Accordingly, the plurality of pieces of coding unit pattern information may be encoded in an integrated manner. A VLC table may be selected in such a manner that the shorter a unary codeword, the higher probabilities of the combinations of the plurality of pieces of coding unit pattern information.

As described above, it is possible to improve encoding efficiency by encoding or decoding a plurality of pieces of coding unit pattern information, which are categorized according to a color component, in an integrated manner, based on the relationship among a plurality of pieces of coding unit pattern information of the same coding unit that are categorized according to a color component and the relationship among a plurality of pieces of coding unit pattern information of the same color component of neighboring coding units.

According to an exemplary embodiment, coding unit pattern information corresponding to a coded depth is set in a coding unit corresponding to the coded depth, hierarchical coding unit pattern information is set in transformation units according to transformation depths, which are divided from the coding unit corresponding to the coded depth, and transformation unit pattern information is set in a final transformation unit.

Thus, the coding unit pattern information corresponding to the coded depth, the hierarchical coding unit pattern information, and the transformation unit pattern information may be defined continuously, based on the hierarchical structures of a coding unit and a transformation unit according to an exemplary embodiment.

Accordingly, in the video encoding apparatus 100 and the video decoding apparatus 200 according to exemplary embodiments, it is possible to determine whether a texture component that is not 0 and that is included from a coding unit to a transformation unit has been encoded by using one piece of data unit pattern information that is hierarchically set according to a transformation depth, without differentiating the coding unit pattern information corresponding to the coded depth, the hierarchical coding unit pattern information, and the transformation unit pattern information from one another.

Figure 27:
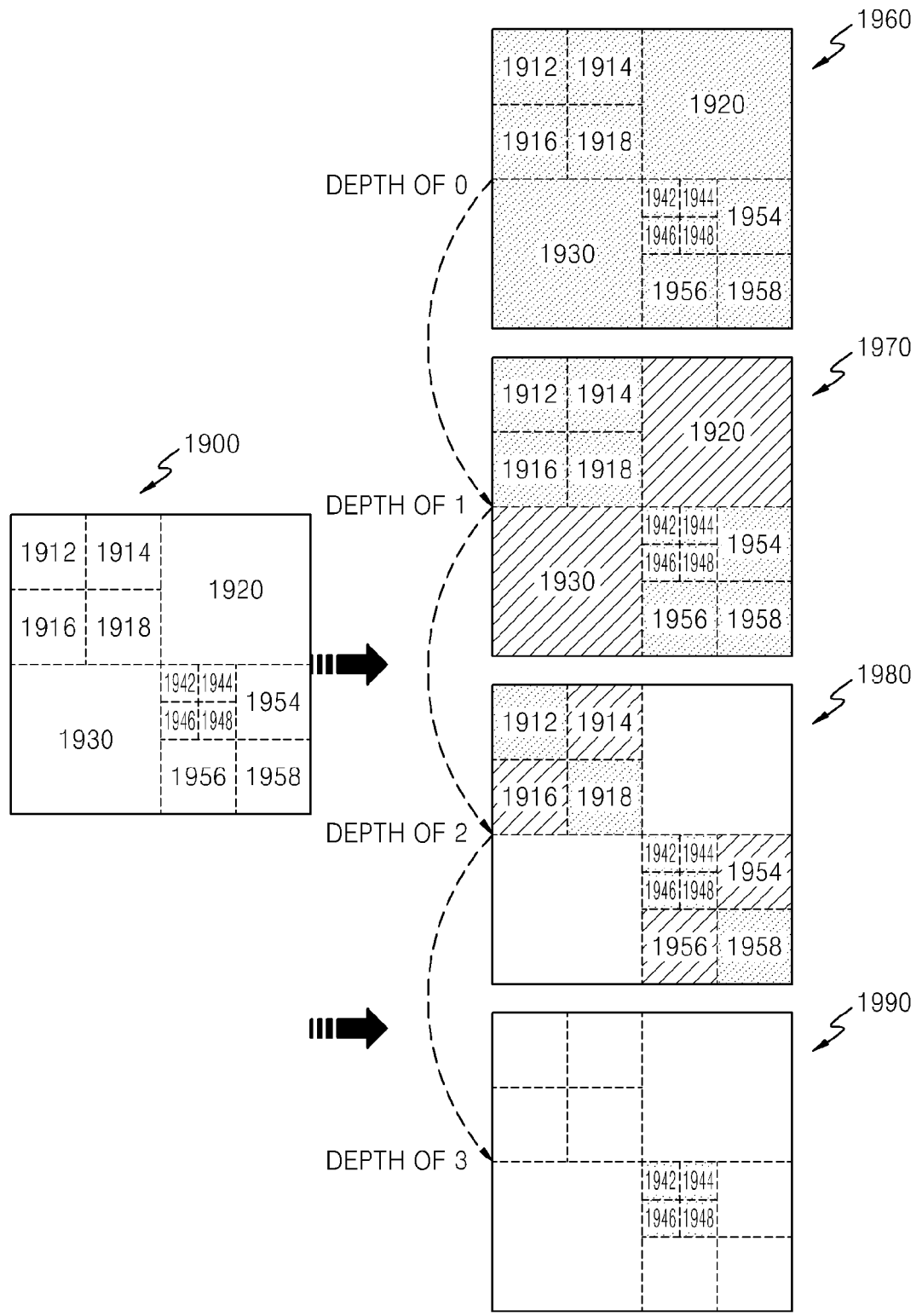
FIG. 27 is a diagram illustrating hierarchical coding unit pattern information according to an exemplary embodiment.

FIG. 27 is a diagram illustrating hierarchical coding unit pattern information according to an exemplary embodiment. Referring to FIG. 27, transformation units 1912, 1914, 1916, 1918, 1920, 1930, 1942, 1944, 1946, 1948, 1954, 1956, and 1958, the sizes of which are determined according to corresponding transformation depths, respectively, are set for a maximum coding unit 1900.

For example, a transformation unit corresponding to the transformation depth of 0 is equal to the maximum coding unit 1900 in size, though the maximum coding unit 1900 illustrated in FIG. 27 does not include the transformation unit corresponding to the transformation depth of 0.

The transformation units 1920 and 1930 are equal to the result of splitting the height and width of the transformation unit corresponding to the transformation depth of 0 into two equal parts, and correspond to a transformation depth of 1. Similarly, the transformation units 1912, 1914, 1916, 1918, 1954, 1956, and 1958 correspond to a transformation depth of 2, and transformation units 1942, 1944, 1946, and 1948 correspond to a transformation depth of 3.

The hierarchical coding unit pattern information indicates whether hierarchical coding unit pattern information regarding a lower transformation depth is to be encoded. Furthermore, the hierarchical coding unit pattern information may reveal whether texture information of the lower transformation depth has been encoded.

The maximum coding unit 1900 does not include the transformation unit corresponding to the transformation depth of 0, and uses texture information of a transformation unit corresponding to the transformation depth of 1 which is lower than the transformation depth of 0. Thus, 1-bit hierarchical coding unit pattern information 1960 is set for the transformation depth of 0.

Regarding the transformation depth of 1, the transformation unit 1920 and the 1930 are decoded in the transformation depth of 1, and thus, texture information of a transformation unit corresponding to the transformation of depth 2 which is lower than the transformation depth of 1 may not be encoded. Also, hierarchical coding unit pattern information regarding the transformation depth of 2 may not be set. Thus, 1-bit hierarchical coding unit pattern information regarding the transformation depth of 1, which indicates that texture information of hierarchical coding unit pattern information regarding the transformation depth of 2 may not be encoded, is provided for each of the transformation units 1920 and 1930.

However, texture information of a transformation unit corresponding to the transformation depth of 2 which is lower than the transformation depth of 1 is to be encoded for each of a group, corresponding to the transformation depth of 1, to which the transformation units 1912, 1914, 1916, and 1918 corresponding to the transformation depth of 2 belong, and a group, corresponding to the transformation depth of 1, to which the transformation units 1942, 1944, 1946, 1948, 1954, and 1956, and 1958 belong. Thus, coding unit pattern information regarding the transformation depth of 2 may be encoded, and 1-bit hierarchical coding unit pattern information regarding the transformation depth of 1 may be set for each of the groups so as to indicate this fact.

Accordingly, a total of 4-bit hierarchical coding unit pattern information 1970 is set for the transformation depth of 1.

Regarding the transformation depth of 2, the transformation units 1912, 1914, 1916, 1918, 1954, 1956, and 1958 may be decoded in the transformation depth of 2. For this reason, texture information of a transformation unit corresponding to the transformation depth of 3 which is lower than the transformation depth of 2 may not be encoded, and thus, hierarchical coding unit pattern information regarding the transformation depth of 3 may not be set. Thus, 1-bit hierarchical coding unit pattern information regarding the transformation depth of 2 may be set for each of the transformation units 1912, 1914, 1916, 1918, 1954, 1956, and 1958 so as to indicate that hierarchical coding unit pattern information regarding the transformation depth of 3 may not be encoded.

However, information of a transformation unit corresponding to the transformation depth of 3 may be encoded for a group, corresponding to the transformation depth of 2, to which the transformation units 1942, 1944, 1946, and 1948 belong. Thus, the coding unit pattern information regarding the transformation depth of 3 may be encoded, and 1-bit hierarchical coding unit pattern information regarding the transformation depth of 2 may be set so as to indicate this fact.

Accordingly, a total of 8-bit hierarchical coding unit pattern information 1980 may be set for the transformation depth of 2.

The transformation depth of 3 is a final transformation depth, and therefore, 1-bit hierarchical coding unit pattern information regarding the transformation depth of 3 may be set for each of the transformation units 1942, 1944, 1946, and 1948 so as to indicate that hierarchical coding unit pattern information regarding a lower transformation depth may not be encoded. Thus, a total of 4-bit hierarchical coding unit pattern information 1990 may be set for the transformation depth of 3.

Figure 28:
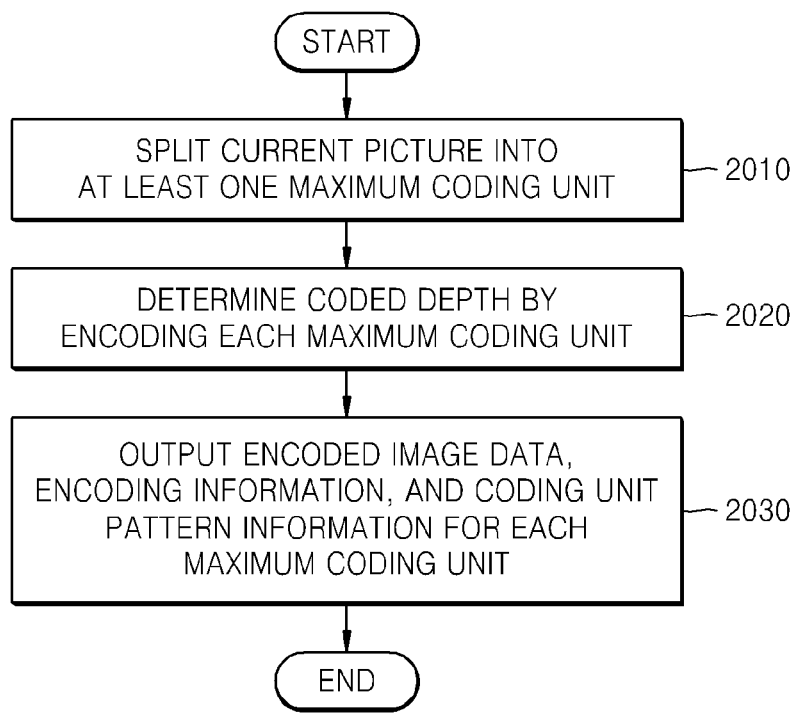
FIG. 28 is a flowchart illustrating a method of encoding video by using coding unit pattern information, according to an exemplary embodiment.

FIG. 28 is a flowchart illustrating a method of encoding video data by using coding unit pattern information, according to an exemplary embodiment. Referring to FIG. 28, in operation 2010, a current picture is split into at least one maximum coding unit. In operation 2020, a coded depth to output a final encoding result according to at least one split region, which is obtained by splitting a region of each of the at least one maximum coding unit according to depths, is determined by encoding the at least one split region, and a coding unit according to a tree structure is determined.

In operation 2030, a result of encoding image data according to one coded depth for each of the at least one maximum coding unit, and a result of encoding information regarding the coded depth and an encoding mode are output.

Coding unit pattern information corresponding to a coded depth, which indicates whether texture information of coding units according to coded depths of the at least one maximum coding unit has been encoded, may be encoded as coding unit pattern information of the at least one maximum coding unit. If hierarchical coding unit pattern information is hierarchically encoded according to a transformation depth, then each of a plurality of pieces of hierarchical coding unit pattern information corresponding to transformation depths indicates whether the hierarchical coding unit pattern information regarding a transformation depth that is lower than the corresponding transformation depth has been encoded.

Figure 29:
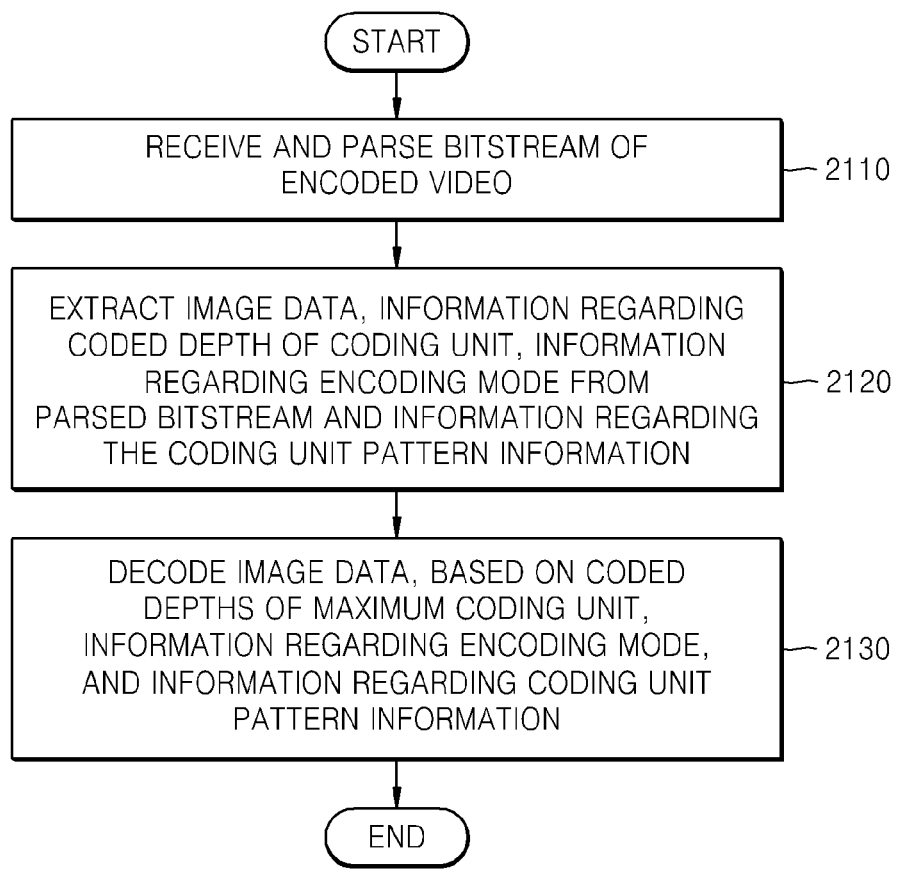
FIG. 29 is a flowchart illustrating a method of decoding video by using coding unit pattern information, according to an exemplary embodiment.

FIG. 29 is a flowchart illustrating a method of decoding video data by using coding unit pattern information, according to an exemplary embodiment. Referring to FIG. 29, in operation 2110, a bitstream of encoded video is received and parsed.

In operation 2120, image data of a current picture assigned to at least one maximum coding unit, information regarding a coded depth of a coding unit according to a tree structure for each of the at least one maximum coding unit, and information regarding an encoding mode, are extracted from the parsed bitstream. Also, the coding unit pattern information indicating whether texture information of a maximum coding unit has been encoded is extracted on a basis of the at least one maximum coding unit. Coding unit pattern information corresponding to a coded depth regarding coding units according to coded depths of each maximum coding unit, and hierarchical coding unit pattern information may be extracted as coding unit pattern information of the at least one maximum coding unit.

In operation 2130, encoded image data corresponding to the at least one maximum coding unit is decoded, based on the coded depths of the at least one maximum coding unit, information regarding an encoding mode, and information regarding the coding unit pattern information, thereby reconstructing the image data. It is possible to determine whether texture information of the coding unit corresponding to the coded depth has been encoded based on the coding unit pattern information corresponding to the coded depth. Also, it is possible to determine whether the hierarchical coding unit pattern information regarding a lower transformation depth has been encoded based on the hierarchical coding unit pattern information regarding each of the transformation depths.

In the coding unit corresponding to the coded depth, data encoded in a transformation unit may be decoded by performing an inverse transformation on a transformation coefficient based on transformation unit pattern information of the transformation unit.

In general, in a related art video encoding/decoding method, a 16×16 or 8×8 macroblock is used as a transformation unit when transformation or inverse transformation is performed on image data. Coded block pattern information is encoded and transmitted on a macro block basis during an encoding process, and is used for a decoding process.

In contrast, according to the above-described exemplary embodiments, coding unit pattern information based on a hierarchically structured coding unit and transformation unit is used. Thus, the coding unit pattern information may be encoded in a coding unit which is greater than a macroblock or is a variously sized data unit. Also, the coding unit pattern information may be encoded in a coding unit, which includes a plurality of hierarchical structured transformation units according to a tree structure, in an integrated manner. Accordingly, the efficiency of encoding/decoding and transmitting the coding unit pattern information can be improved.

One or more exemplary embodiments may be embodied as a computer program. The computer program may be stored in a computer readable recording medium, and executed using a general digital computer. Examples of the computer readable medium include a magnetic recording medium (a ROM, a floppy disc, a hard disc, etc.), and an optical recording medium (a CD-ROM, a DVD, etc.).

While exemplary embodiments have been particularly shown and described, it will be understood by those of ordinary skill in the art that various changes in form and details may be made therein without departing from the spirit and scope of the present inventive concept as defined by the appended claims. The exemplary embodiments should be considered in descriptive sense only and not for purposes of limitation. Therefore, the scope of the present inventive concept is defined not by the detailed description of exemplary embodiments, but by the appended claims, and all differences within the scope will be construed as being included in the present inventive concept.

What is claimed is:

1. A video decoding apparatus comprising:
    an extractor which extracts from a bitstream transformation index information indicating whether a transformation unit of a current level included in a current coding unit is split;
    a decoder which splits the transformation unit of the current level into transformation units of a lower level when the transformation index information indicates a split of the transformation unit of the current level,
    wherein the extractor further extracts pattern information for the transformation unit of the current level when the transformation index information indicates a non-split of the transformation unit of the current level,
    wherein the pattern information indicates whether the transformation unit of the current level contains one or more transform coefficients not equal to 0.

2. The video decoding apparatus of claim 1, wherein the transformation unit of the current level is included in the coding unit, and a size of the transformation unit of the current level is smaller than or equal to a size of the coding unit.

3. The video decoding apparatus of claim 2, wherein the transformation unit of the current level is obtained by halving a height and a width of the coding unit.

4. The video decoding apparatus of claim 1, wherein the coding unit is a data unit in which a picture of the encoded video is encoded and the transformation unit of the current level is a data unit in which the data of the coding unit is transformed.

* * * * *